(12) United States Patent
Page

(10) Patent No.: US 11,952,097 B1
(45) Date of Patent: Apr. 9, 2024

(54) BLENDED WING BODY AIRCRAFT

(71) Applicant: JETZERO, INC., Long Beach, CA (US)

(72) Inventor: Mark Allan Page, Long Beach, CA (US)

(73) Assignee: JetZero, Inc., Long Beach, CA (US)

( * ) Notice: Subject to any disclaimer, the term of this patent is extended or adjusted under 35 U.S.C. 154(b) by 0 days.

(21) Appl. No.: 18/202,151

(22) Filed: May 25, 2023

(51) Int. Cl.
*B64C 1/14* (2006.01)
*B64C 39/10* (2006.01)
*B64F 5/30* (2017.01)

(52) U.S. Cl.
CPC ............ *B64C 1/1423* (2013.01); *B64C 39/10* (2013.01); *B64F 5/30* (2017.01); *B64C 2039/105* (2013.01)

(58) Field of Classification Search
CPC . B64C 1/1423; B64C 39/10; B64C 2039/105; B64F 5/30
See application file for complete search history.

(56) References Cited

U.S. PATENT DOCUMENTS

| 6,595,466 | B2 | 7/2003 | Depeige | |
| 7,570,274 | B2 * | 8/2009 | Humphries | ........ B64D 11/0015 340/988 |
| 10,167,081 | B2 * | 1/2019 | Gallant | .................... B64D 9/00 |
| 10,407,151 | B2 | 9/2019 | Cazals | |
| 10,899,451 | B2 * | 1/2021 | Saint-Marc | .......... B64D 11/003 |
| 2004/0217234 | A1 * | 11/2004 | Jones | .................... A61M 21/02 244/118.5 |
| 2011/0121130 | A1 * | 5/2011 | Odle | ........................ B64C 1/22 244/36 |
| 2017/0183078 | A1 | 6/2017 | Cazals | |
| 2018/0001999 | A1 * | 1/2018 | Page | ....................... B64C 25/14 |
| 2018/0334254 | A1 * | 11/2018 | Saint-Marc | .......... B64D 11/003 |
| 2020/0207463 | A1 * | 7/2020 | Schuster | ................. B64C 25/26 |
| 2020/0207476 | A1 * | 7/2020 | Whitlock | ............... B64D 25/14 |
| 2022/0001974 | A1 * | 1/2022 | Page | ....................... B64D 9/00 |
| 2022/0388633 | A1 * | 12/2022 | Page | ....................... B64C 25/14 |

FOREIGN PATENT DOCUMENTS

EP    2591996 A1 *   5/2013   ............... B64C 1/00

OTHER PUBLICATIONS

Page et al. ("Single-Aisle Airliner Disruption With a Single-Deck Blended-Wingbody") (Year: 2018).*

* cited by examiner

*Primary Examiner* — Assres H Woldemaryam
(74) *Attorney, Agent, or Firm* — Caldwell Intellectual Property Law

(57) ABSTRACT

Described herein is a blended wing body aircraft. In some embodiments, a blended wing body aircraft may include a set of passenger loading doors on a first lateral side of the aircraft, and a set of passenger unloading doors on the second lateral side of the aircraft. In some embodiments, this configuration may allow for more efficient loading and unloading of blended wing body aircraft.

19 Claims, 14 Drawing Sheets

BLENDED WING BODY AIRCRAFT

FIELD OF THE INVENTION

The present invention generally relates to the field of aircraft. In particular, the present invention is directed to blended wing body aircraft.

BACKGROUND

Aircraft typically load and unload passengers through a single door at the front of the aircraft. This can cause traffic, and passengers for the next flight must wait to load while passengers from the previous flight unload, potentially reducing efficiency.

SUMMARY OF THE DISCLOSURE

In an aspect, a blended wing body aircraft may include a first passenger loading door and a second passenger loading door on a first lateral side of the blended wing body aircraft; and a first passenger unloading door and a second passenger unloading door on a second lateral side of the blended wing body aircraft; wherein there is no clear demarcation between the wings and body of the blended wing body aircraft along a leading edge of the blended wing body aircraft.

In another aspect, a method of loading and unloading a blended wing body aircraft may include loading passengers onto the blended wing body aircraft using a first passenger loading door and a second passenger loading door on a first lateral side of the blended wing body aircraft; and unloading passengers from the blended wing body aircraft using a first passenger unloading door and a second passenger unloading door on a second lateral side of the blended wing body aircraft.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
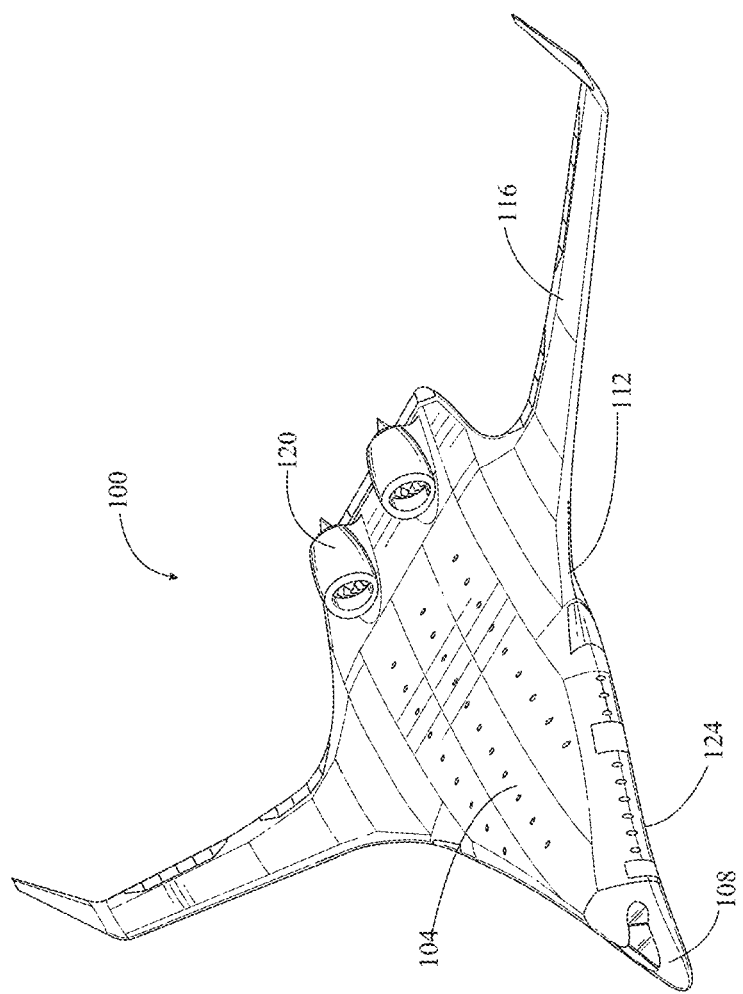
FIG. 1 is a schematic illustration of a top, front, and left perspective view of an exemplary blended wing body aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to blended wing body aircraft and methods of loading and unloading passengers onto and from blended wing body aircraft. In some embodiments, described herein is a blended wing body aircraft including a first set of passenger doors on a first side of the aircraft and a second set of passenger doors on a second side of the aircraft. In some embodiments, passengers may enter the aircraft using doors on a first side and exit the aircraft using doors on a second side. In some embodiments, this may allow for more efficient loading and unloading of the aircraft. In some embodiments, loading and unloading passengers using doors on different sides of the aircraft may allow a first set of passengers to load while a previous set of passengers is unloading. In some embodiments, loading and unloading passengers using doors on different sides of the aircraft may allow cleaning personnel to enter the aircraft using different doors than passengers are exiting the aircraft from during. In some embodiments, inclusion of entry doors on a first side of the aircraft and exit doors on the opposite side of the aircraft may prevent and/or mitigate traffic problems in situations in which multiple parties need to enter and exit an aircraft simultaneously. In some embodiments, a blended wing body aircraft may include multiple entry doors on a first lateral side of the aircraft and multiple exit doors on a second lateral side of the aircraft. In some embodiments, inclusion of multiple entry and exit doors may further improve loading and/or unloading efficiency.

In some embodiments, conventional tube and wing aircraft may have slow loading patterns due to passengers entering through a single choke point at a single doorway at the front of the aircraft, passengers blocking aisles to stow bags, passengers blocking aisles in order to allow other passengers to enter specific seats, and inefficient loading orders. In some embodiments, conventional tube and wing aircraft may have slow unloading patterns due to the single doorway choke point, and passengers blocking aisles to unload bags. These slow loading and unloading processes may extend the amount of time conventional tube and wing aircraft must wait between flights, reducing efficiency. In some embodiments, a blended wing body aircraft described herein, and/or a method of aircraft loading and/or unloading described herein may avoid these drawbacks.

In some embodiments, conventional tube and wing aircraft may load passengers from front to back, wherein passengers seated in the forward portion of the aircraft are seated prior to passengers in the aft portion of the aircraft. At least in part, this may be desirable in order to prevent the aircraft from tipping backwards if too many passengers are seated first in the rear of the aircraft. In some embodiments, tipping backwards may not be a concern for blended wing body aircraft due to positioning of aft-mounted main landing gear. In some embodiments, this may allow for different loading patterns than are typically used.

Referring now to FIG. 1, an exemplary embodiment of blended wing body aircraft is illustrated. Blended wing body aircraft may include a computing device. Blended wing body aircraft may include a processor. Processor may include, without limitation, any processor described in this disclosure. Processor may be included in a computing device. Computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device may include a single computing device operating independently, or may include two or more computing device operating in concert, in parallel, sequentially or the like; two or more computing devices may be included together in a single computing device or in two or more computing devices. Computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device may include but is not limited to, for example, a computing device or cluster of computing devices in a first location and a second computing device or cluster of computing devices in a second location. Computing device may include one or more computing devices dedicated to data storage, security, distribution of traffic for load balancing, and the like. Computing device may distribute one or more computing tasks as described below across a plurality of computing devices of computing device, which may operate in parallel, in series, redundantly, or in any other manner used for distribution of tasks or memory between computing devices. Computing device may be implemented, as a non-limiting example, using a "shared nothing" architecture.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, as used herein, a "lateral" direction of an aircraft is a direction running in a straight line from wing tip to wing tip. Lateral direction may be orthogonal to longitudinal direction. As used herein, a "longitudinal" direction of an aircraft is a direction running in a straight line from nose to tail of the aircraft. Lateral direction is indicated by axis B in FIG. 2 and longitudinal direction is indicated by axis A in FIG. 2. As used herein, a first element of an aircraft is "behind" a second element of the aircraft if the first element is, on the longitudinal axis, closer to the tail of the aircraft than the second element.

Still referring to FIG. 1, disclosed herein is a blended wing body (BWB) aircraft 100. As used herein, a "blended wing body aircraft" is a fixed-wing aircraft body having no clear or abrupt demarcation between wings and a main body of the aircraft along a leading edge of the aircraft. For example, BWB aircraft 100 may have distinct wings 116 and body structures, which are smoothly blended together with no clear dividing line or boundary feature between wings 116 and fuselage. This contrasts with a flying wing, which has no distinct fuselage, and a lifting body, which has no distinct wings. BWB aircraft 100 may or may not be tailless. In some embodiments, and without wishing to be limited by theory, a potential advantage of BWB aircraft 100 may be to reduce wetted area and any accompanying drag associated with a tube and wing wing-body junction. In some cases, BWB aircraft 100 may also have a wide airfoil-shaped body, allowing entire aircraft to generate lift and thereby facilitate reduction in size and/or drag of wings 116. In some cases, BWB aircraft 100 may be understood as a hybrid shape that resembles a flying wing, but also incorporates features from tube and wing aircraft. In some embodiments, and without wishing to be limited by theory, this combination may offer several advantages over tube-and-wing airframes. In some embodiments, a BWB airframe may help to increase fuel economy and create larger payload (cargo or passenger) volumes within BWB aircraft 100. BWB aircraft 100 may allow for advantageous interior designs. For instance, cargo can be loaded and/or passengers can board from the front or rear of the aircraft. A cargo or passenger area may be distributed across a relatively wide (when compared to tube-wing aircraft) fuselage, providing a large usable volume.

Still referring to FIG. 1, in some embodiments, BWB aircraft 100 may include a main body 104. As used herein, a "main body" of a BWB aircraft is a portion of the BWB aircraft that is capable of holding passengers and/or cargo. In some embodiments, main body 104 may include a fuselage of BWB aircraft 100. In some embodiments, main body 104 may be contrasted to a tube and wing body aircraft, wherein the aircraft tube and wing body contains a clear transition between the fuselage and the aircraft wing.

Still referring to FIG. 1, BWB aircraft 100 may include at least a fuselage. As used herein, a "fuselage" of an aircraft is a main body of the aircraft. In some embodiments, a fuselage of BWB aircraft 100 may include an entirety of the BWB aircraft 100 except for nose 108, wings 116, empennage, nacelles, and control surfaces. In some cases, fuselage may contain an aircraft's payload. At least a fuselage may comprise structural elements that physically support a shape and structure of BWB aircraft 100. Structural elements may take a plurality of forms, alone or in combination with other types. Structural elements may vary depending on construction type of BWB aircraft 100 and specifically, fuselage.

Still referring to FIG. 1, in some embodiments, BWB aircraft 100 may include a nose portion 108. As used herein, a "nose portion" is a portion of BWB aircraft 100 forward of the aircraft's fuselage. Nose portion 108 may include a cockpit (for manned aircraft), canopy, aerodynamic fairings, windshield, and/or structural elements required to support mechanical loads. Nose portion 108 may also include pilot equipment such as pilot seats, control interfaces, gages, displays, inceptor sticks, throttle controls, collective pitch controls, communication equipment, and the like. Nose portion 108 may comprise a swing nose configuration. A swing nose may be characterized by an ability of the nose to move, manually or automatedly, into a differing orientation than its flight orientation to provide an opening for loading a payload into aircraft fuselage from the front of the aircraft. Nose portion 108 may be configured to open in a plurality of orientations and directions.

Still referring to FIG. 1, in some embodiments, BWB aircraft 100 may include a transition 112. As used herein, a "transition" is a section of a BWB aircraft between a main body and a wing. In some embodiments, transition 112 may increase in chord and thickness from wing 116 in a direction of main body 104.

Still referring to FIG. 1, at least a flight component may include, in non-limiting examples, wings 116, empennages, nacelles, control surfaces, fuselages, and landing gear. In embodiments, an empennage may be disposed at the aftmost point of BWB aircraft 100. Empennage may comprise a tail of BWB aircraft 100, further comprising rudders, vertical stabilizers, horizontal stabilizers, stabilators, elevators, trim tabs, among others. At least a portion of empennage may be manipulated directly or indirectly by pilot commands to impart control forces on a fluid in which the BWB aircraft 100 is flying. Manipulation of these empennage control surfaces may, in part, change an aircraft's heading in pitch, roll, and yaw.

Still referring to FIG. 1, in some embodiments, BWB aircraft 100 may include a plurality of wings 116. As used herein, a "wing" is a fin or an extended member that produces lift for an aircraft while an aircraft is traveling through air. In some embodiments, at least a flight component may include a wing 116. Wings 116 may include structures which include airfoils configured to create a pressure differential resulting in lift. In some embodiments, wings 116 may be disposed on a left and right side of BWB aircraft 100 symmetrically, at a point between nose 108 and empennage. Wings 116 may include a plurality of geometries in planform view, swept swing, tapered, variable wing, triangular, oblong, elliptical, square, among others. Wings 116 may be blended into the body of the aircraft such as in a BWB aircraft 100 where no strong delineation of body and wing 116 exists. A wing's cross section geometry may comprise an airfoil. As used herein, an "airfoil" is a shape specifically designed such that a fluid flowing on opposing sides of it exert differing levels of pressure against the airfoil. In some embodiments, a bottom surface of an aircraft may be configured to generate a greater pressure than does a top surface, resulting in lift. A wing 116 may comprise differing and/or similar cross-sectional geometries over its cord length, e.g. length from wing tip to where wing meets the aircraft's body. One or more wings may be symmetrical about an aircraft's longitudinal plane, which comprises a longitudinal or roll axis reaching down a center of the aircraft through the nose and empennage, and the aircraft's yaw axis. In some cases, wings 116 may include controls surfaces configured to be commanded by a pilot and/or autopilot to change a wing's geometry and therefore its interaction with a fluid medium. Flight component may include control surfaces. Control surfaces may include without limitation flaps, ailerons, tabs, spoilers, and slats, among others. In some embodiments, control surfaces may be disposed on wings in a plurality of locations and arrangements. In some cases, control surfaces may be disposed at leading and/or trailing edges of wings 116, and may be configured to deflect up, down, forward, aft, or any combination thereof.

Still referring to FIG. 1, in some embodiments, flight component may include a winglet. As used herein, a "winglet" is a flight component configured to manipulate a fluid medium and is mechanically attached to an aircraft wing. "Winglet" and "wingtip device" are used interchangeably herein. Wingtip devices may be used to improve efficiency of fixed-wing aircraft by reducing drag. Although there are several types of wingtip devices which function in different manners, their intended effect may be to reduce an aircraft's drag by partial recovery of tip vortex energy. Wingtip devices may also improve aircraft handling characteristics and enhance safety for BWB aircraft 100. Such devices increase an effective aspect ratio of a wing without greatly increasing wingspan. Extending wingspan may lower lift-induced drag but would increase parasitic drag and would require boosting the strength and weight of the wing. As a result, according to some aeronautic design equations, a maximum wingspan made be determined above which no net benefit exits from further increased span. There may also be operational considerations that limit the allowable wingspan (e.g., available width at airport gates).

Still referring to FIG. 1, wingtip devices, in some embodiments, may increase lift generated at wingtip (by smoothing airflow across an upper wing near the wingtip) and reduce lift-induced drag caused by wingtip vortices, thereby improving a lift-to-drag ratio. This increases fuel efficiency in powered aircraft and increases cross-country speed in gliders, in both cases increasing range. In some embodiments, a given improvement in fuel efficiency may correlate directly and causally with increase in an aircraft's lift-to-drag ratio. An upward angle (i.e., cant) of a winglet, its inward or outward angle (i.e., toe), as well as its size and shape are selectable design parameters which may be chosen for correct performance in a given application. A wingtip vortex, which rotates around from below a wing, strikes a cambered surface of a winglet, generating a force that angles inward and slightly forward. A winglet's relation to a wingtip vortex may be considered analogous to sailboat sails when sailing to windward (i.e., close-hauled). Similar to a close-hauled sailboat's sails, winglets may convert some of what would otherwise-be wasted energy in a wingtip vortex to an apparent thrust. This small contribution may be worthwhile over an aircraft's lifetime. Another potential benefit of winglets is that they may reduce an intensity of wake vortices. Wake vortices may trail behind an aircraft and pose a hazard to other aircraft. Minimum spacing requirements between aircraft at airports are largely dictated by hazards, such as those from wake vortices. Aircraft may be classified by weight (e.g., "Light," "Heavy," and the like) often based upon vortex strength, which grows with an aircraft's lift coefficient. Thus, associated turbulence is greatest at low speed and high weight, which may be produced at high angle of attack near airports. Winglets and wingtip fences may increase efficiency by reducing vortex interference with laminar airflow near wingtips, by moving a confluence of low-pressure air (over wing) and high-pressure air (under wing) away from a surface of the wing. Wingtip vortices may create turbulence, which may originate at a leading edge of a wingtip and propagate backwards and inboard. This turbulence may delaminate airflow over a small triangular section of an outboard wing, thereby frustrating lift in that area. In some embodiments, a fence/winglet drives an area where a vortex forms upward away from a wing surface, as the resulting vortex is repositioned to a top tip of the winglet.

Still referring to FIG. 1, in some embodiments, wings 116 may include folding wings 116 wherein a portion of wings 116 may fold to minimize a width of BWB aircraft 100. Folding wings 116 may include hinges along a portion of wings 116 wherein folding wings 116 may fold in a direction of main body 104. Folding wing 116 may further include wings 116 that fold in a direction parallel to main body 104. "Hinge" as described herein is a mechanism that is attached to at least two components and allows for movement of the at least two components relative to each other. In some embodiments, folding wings 116 may allow BWB aircraft 100 to adopt a configuration that has a smaller horizontal footprint when landed, such as at a gate. This may allow BWB aircraft 100 with a larger passenger cabin to fit at a gate than would otherwise be possible given the amount of space at a given gate. In some embodiments, a passenger cabin may be located within main body and has a wide body passenger capacity. "Passenger cabin" as described in this disclosure is an area within main body which passengers may be located and seated during a flight. Passenger cabin may include passenger seats, passenger tables, aisles, passenger bathrooms, and the like. In some embodiments, passenger cabin comprises more than two passenger aisles, wherein each passenger aisle may include one or more passenger seats on each side of the passenger aisle. In some embodiments, passenger cabin may comprise more than two passenger aisles, wherein the more than two passenger aisles are parallel to each other. In some embodiments, passenger cabin may include 3 or 4 aisles. Passenger cabin having 3 or 4 aisles may reduce waiting time when passengers are boarding and deboarding aircraft 100. The aisles within passenger cabin may be parallel to one another. Additionally, or alternatively, one or more passenger aisles may be perpendicular to one or more passenger aisles. In some embodiments, Passenger cabin may be located in a lateral middle of main body. As used in this disclosure, a "lateral" direction of an aircraft may refer to a direction running from wing tip to wing tip. Lateral direction may be substantially orthogonal to a nose to tail direction. In some embodiments, passenger cabin may include a seat row count wherein the seat row count is a maximum number of passenger seats within a given row. Passenger cabin may further include a seat width wherein the seat width is a width of each passenger seat within passenger cabin. In some embodiments, seat row count and seat width may be substantially independent of a drag of the aircraft. For example, unlike tube and wing aircraft, that may contain a maximum seat row count (e.g. 12 seats on a commercial aircraft) due to drag concerns, BWB may include a larger seat row count without issues of drag. Seat row count and seat width may be substantially independent of drag due to reduced wetted area when compared to tube and wing aircraft. Additionally, or alternatively, seat row count may be independent of a wing length. Unlike tube and wing aircraft, BWB passenger cabin and seat row count is not directly proportional to a wing length. For example, a BWB having a large passenger cabin may contain the same wing length of a BWB having a smaller passenger cabin.

With continued reference to FIG. 1, passenger cabin contains wide body passenger capacity. "Wide body passenger capacity" as described in this disclosure refers to a passenger capacity similar to the passenger capacity of a tube and wing commercial aircraft with a fuselage large enough to accommodate two or more passenger aisles, wherein wide body passenger capacity is subject to a plurality of cabin constraints. The passenger capacity of a tube and wing twin aisle tube and wing aircraft may contain a minimum of 200 passenger seats and a maximum of 800 passenger seats. In some embodiments, wide body passenger capacity may include a maximum passenger capacity of at least 200 passengers. In some embodiments, wide body passenger capacity may include a maximum passenger capacity of at least 300 passengers. "Plurality of cabin constraints" as defined in this disclosure are limitations to the number of seats, passengers, seat sizes, seats in a row and the like. Plurality of cabin constraints may include a wide body seat size. "Wide body seat size" as described herein refers to a passenger seat size of a tube and wing commercial wide body aircraft. For example, Wide body seat size may include seat dimensions similar to that of a Boeing 787 Dreamliner. Wide body seat size may include a seat width and seat pitch. Seat width as described herein refers to a range of width for a passenger seat. In some embodiments, seat width may contain a minimum seat width of 18 inches. Additionally, or alternatively, seat width may contain a minimum seat width of 16 inches. "Seat pitch" as described in this disclosure is the distance from any point on one seat to the same point on another seats. Seat pitch may contain a minimum seat pitch of 27 inches. Wide body seat size may further include an arm rest having an arm rest width. The arm rest width may contain a width of at least 2 inches. In some embodiments, seat pitch may contain a minimum seat pitch of between 30 and 35 inches. Plurality of cabin constraints may further include at least a single aisle. At least a single aisle may contain an aisle width of at least 15 inches. In some embodiments at least a single aisle may contain an aisle width of at least 20 inches. Plurality of cabin constraints may further contain a minimum or maximum packing efficiency. Packing efficiency will be described in greater detail below. Plurality of cabin constrains may contain a seat row amount wherein the seat row amount may contain a minimum or maximum number of seats per a given row. The seat row amount may be at least 2 seats per row. In some embodiments, the seat row amount may contain a maximum of 16 seats per row. Plurality of cabin constraints may further include a seat row limit wherein the seat row limit is the number of seats within a given row before it needs to be separated by an aisle. For example, a seat row limit of 2, would require a row of 8 seats to have at least 4 passenger aisles. In another nonlimiting example, a seat row limit of 4 would require a row of 8 seats to have at least one passenger aisle. In some cases, wide body passenger capacity may be a function of regulatory, efficiency and/or market constraints.

Still referring to FIG. 1, commercial aircraft 100 may include at least a propulsor 120. In some embodiments, at least a propulsor 120 may be attached to a portion of main body 104 and configured to propel BWB aircraft 100 through air. At least a propulsor 120 may include an electric motor, a jet engine, propellers, turboprop engines, turbojet engines, turboshaft engines, fuel cell driven motors, piston driven engines, and the like. At least a propulsor 120 may include an additional propulsor 120 or alternatively a plurality of propulsors, wherein each at least a propulsor 120 works individually or in tandem to provide thrust, life or counteract any forces acting on aircraft. At least a propulsor 120 may be powered by fuel such as jet fuel, a battery powering a propeller, gasoline-based fuels, diesel-based fuels hydrogen fuel, fuel cells and the like. At least a propulsor 120 may be attached to an aft surface of commercial aircraft 100. In some embodiments, at least a propulsor 120 may be mounted and mechanically fastened onto an upper aft surface of main body 104.

Still referring to FIG. 1, commercial aircraft 100 may include a fuel storage. As used herein, a "fuel storage" is a compartment within a BWB aircraft configured to hold fuel used to propel the BWB aircraft. In some embodiments, fuel storage may be located within wing. In some embodiments, wing may contain a cavity wherein fuel storage may be located and stored. In some embodiments, fuel storage may be stored within transition 112. Fuel storage may be located within transition 112 wherein fuel storage is located within a cavity located in the increased chord and thickness. In some embodiments, fuel storage may be located in a portion of transition 112 and/or a portion of wings. In some embodiments, fuel storage may be larger than a fuel storage of a tube and wing aircraft due to the increased chord and thickness of transition 112.

Still referring to FIG. 1, BWB aircraft 100 may include at least a flight component. In some embodiments, at least a flight component may include a propulsor 120. A flight component may be consistent with any description of a flight component described in this disclosure, such as without limitation propulsors, control surfaces, rotors, engines, propellers, wings, winglets, or the like. For the purposes of this disclosure, at least a "flight component" is at least one element of an BWB aircraft 100 configured to manipulate a fluid medium such as air to propel, control, or maneuver an aircraft. In nonlimiting examples, at least a flight component may include a rotor mechanically connected to a rotor shaft of an electric motor further mechanically affixed to at least a portion of BWB aircraft 100. In some embodiments, at least a flight component may include a propulsor 120, for example a rotor attached to an electric motor configured to produce shaft torque and in turn, create thrust. As used in this disclosure, an "electric motor" is an electrical machine that converts electric energy into mechanical work.

Still referring to FIG. 1, BWB aircraft 100 may include a flight component that includes at least a nacelle. For the purposes of this disclosure, a "nacelle" is a streamlined body housing, which is sized according to that which is houses, such as without limitation an engine, a fuel store, or a flight component. When attached by a pylon entirely outside BWB aircraft 100, a nacelle may sometimes be referred to as a pod, in which case an engine within the nacelle may be referred to as a podded engine. In some cases an aircraft cockpit may also be housed in a nacelle, rather than in a fuselage. At least a nacelle may substantially encapsulate a propulsor 120, which may include a motor or an engine. At least a nacelle may be mechanically connected to at least a portion of BWB aircraft 100 partially or wholly enveloped by an outer mold line of the BWB aircraft 100. At least a nacelle may be designed to be streamlined. At least a nacelle may be asymmetrical about a plane comprising the longitudinal axis of the engine and the yaw axis of BWB aircraft 100.

Still referring to FIG. 1, a flight component may include a propulsor 120. A "propulsor," as used herein, is a component or device used to propel a craft by exerting force on a fluid medium, which may include a gaseous medium such as air or a liquid medium such as water. For the purposes of this disclosure, "substantially encapsulate" is the state of a first body (e.g., housing) surrounding all or most of a second body. A motor may include without limitation, any electric motor, where an electric motor is a device that converts electrical energy into mechanical work for instance by causing a shaft to rotate. A motor may be driven by direct current (DC) electric power; for instance, a motor may include a brushed DC motor or the like. A motor may be driven by electric power having varying or reversing voltage levels, such as alternating current (AC) power as produced by an alternating current generator and/or inverter, or otherwise varying power, such as produced by a switching power source. A motor may include, without limitation, a brushless DC electric motor, a permanent magnet synchronous motor, a switched reluctance motor, and/or an induction motor; persons skilled in the art, upon reviewing the entirety of this disclosure, will be aware of various alternative or additional forms and/or configurations that a motor may take or exemplify as consistent with this disclosure. In addition to inverter and/or switching power source, a circuit driving motor may include electronic speed controllers or other components for regulating motor speed, rotation direction, torque, and/or dynamic braking. Motor may include or be connected to one or more sensors detecting one or more conditions of motor; one or more conditions may include, without limitation, voltage levels, electromotive force, current levels, temperature, current speed of rotation, position sensors, and the like. For instance, and without limitation, one or more sensors may be used to detect back-EMF, or to detect parameters used to determine back-EMF, as described in further detail below. One or more sensors may include a plurality of current sensors, voltage sensors, and speed or position feedback sensors. One or more sensors may communicate a current status of motor to a flight controller and/or a computing device; computing device may include any computing device as described in this disclosure, including without limitation, a flight controller.

Still referring to FIG. 1, in some embodiments, a propulsor 120 may include a motor and a thrust element. In some embodiments, a motor may be connected to a thrust element. Thrust element may include any device or component that converts mechanical work, for example of a motor or engine, into thrust in a fluid medium. Thrust element may include, without limitation, a device using moving or rotating foils, including without limitation one or more rotors, an airscrew or propeller, a set of airscrews or propellers such as contra-rotating propellers or co-rotating propellers, a moving or flapping wing, or the like. Thrust element may include without limitation a marine propeller or screw, an impeller, a turbine, a pump-jet, a paddle or paddle-based device, or the like. Thrust element may include a rotor. Persons skilled in the art, upon reviewing the entirety of this disclosure, will be aware of various devices that may be used as thrust element. A thrust element may include any device or component that converts mechanical energy (i.e., work) of a motor, for instance in form of rotational motion of a shaft, into thrust within a fluid medium. As another non-limiting example, a thrust element may include an eight-bladed pusher propeller, such as an eight-bladed propeller mounted behind the engine to ensure the drive shaft is in compression.

Still referring to FIG. 1, in nonlimiting embodiments, at least a flight component may include an airbreathing engine such as a jet engine, turbojet engine, turboshaft engine, ramjet engine, scramjet engine, hybrid propulsion system, turbofan engine, or the like. At least a flight component may be fueled by, in non-limiting examples, Jet-A, Jet-B, diesel fuel, gasoline, or the like. In nonlimiting embodiments, a jet engine may include a type of reaction engine discharging a fast-moving jet that generates thrust by jet propulsion. In some embodiments, a jet engine may include an internal combustion airbreathing jet engine such as a turbojet, turbofan, ramjet, or pulse jet. In some embodiments, a jet engine may include an internal combustion engine. As used herein, a "combustion engine" is a mechanical device that is configured to convert mechanical work from heat produced by combustion of a fuel. In some embodiments, a combustion engine may operate according to an approximation of a thermodynamic cycle, such as without limitation a Carnot cycle, a Cheng cycle, a Combined cycle, a Brayton cycle, an Otto cycle, an Allam power cycle, a Kalina cycle, a Rankine cycle, and/or the like. In some cases, a combustion engine may include an internal combustion engine. In some embodiments, an internal combustion engine may include a heat engine in which combustion of fuel occurs with an oxidizer (usually air) in a combustion chamber that comprises a part of a working fluid flow circuit. Exemplary internal combustion engines may without limitation a reciprocating engine (e.g., 4-stroke engine), a combustion turbine engine (e.g., jet engines, gas turbines, Brayton cycle engines, and the like), a rotary engine (e.g., Wankel engines), and the like. In nonlimiting embodiments, airbreathing jet engines feature a rotating air compressor powered by a turbine, with leftover power providing thrust through a propelling nozzle—this process may be known as a Brayton thermodynamic cycle. Jet aircraft may use such engines for long-distance travel. In some embodiments, a jet engine is a turbojet engine. In some embodiments, a jet engine is a high bypass turbofan engine. In some embodiments, a high bypass turbofan engine may result in higher speed and greater fuel efficiency than piston and propeller aeroengines over long distances. A few air-breathing engines made for highspeed applications (ramjets and scramjets) may use a ram effect of aircraft's speed instead of a mechanical compressor. An airbreathing jet engine (or ducted jet engine) may emit a jet of hot exhaust gases formed from air that is forced into the engine by several stages of centrifugal, axial or ram compression, which is then heated and expanded through a nozzle. In some cases, a majority of mass flow through an airbreathing jet engine may be provided by air taken from outside of the engine and heated internally, using energy stored in the form of fuel. In some cases, a jet engine may include are turbofans. In some cases, a turbofan engine may include a gas turbine engine core with high overall pressure ratio (e.g., 40:1) and high turbine entry temperature (e.g., about 1800 K) and provide thrust with a turbine-powered fan stage. In some cases, thrust may also be at least partially provided by way of pure exhaust thrust (as in a turbojet engine). In some cases, a turbofan may have a high efficiency, relative to a turbojet. In some cases, a jet engine may use simple ram effect (e.g., ramjet) or pulse combustion (e.g., pulsejet) to give compression.

Still referring to FIG. 1, in some embodiments, BWB aircraft 100 may include a passenger cabin. Passenger cabin may be located within main body 104. As used herein, a "passenger cabin" is an area within main body which passengers may be located and seated during a flight. Passenger cabin may include passenger seats, passenger tables, aisles, passenger bathrooms, and the like.

Still referring to FIG. 1, in some embodiments, passenger cabin may include a single deck, with cargo and passengers each substantially located on or above the single deck. As used in this disclosure, a "deck" on an aircraft is platform upon which one or more of passengers and cargo may be stored. A single deck may be contrasted with a two-deck configuration analogously to a single-story building contrasted to a two-story building. Single deck may include a deck with various heights differentials. For example, single deck may include a step wherein a portion of passenger cabin is slightly elevated in comparison to another portion of passenger cabin. BWB aircraft 100 may further include a cargo store. As used herein, a "cargo store" is a location for storing passenger belongings during flight. In a non-limiting example, cargo store may contain baggage of passengers on during flight. In some embodiments, cargo store may be located within passenger cabin. In a non-limiting example, cargo store may be located above passenger seats. In some embodiments, cargo store may also be located lateral to passenger cabin. In some embodiments, cargo store may be located within a wing portion of BWB aircraft 100.

Still referring to FIG. 1, in some embodiments, a deck may be supported by one or more posts and/or beams. In some embodiments, a post may be supporting a deck of BWB aircraft 100. A post may act similarly to stringer in that it is configured to support axial loads in compression due to a load being applied parallel to its axis due to, for example, a heavy object being placed on a floor of BWB aircraft 100. A beam may be disposed in or on any portion a fuselage that requires additional bracing, specifically when disposed transverse to another structural element, such as a post, which would benefit from support in that direction, opposing applied force. A beam may be disposed in a plurality of locations and orientations within a fuselage as necessitated by operational and constructional requirements.

Still referring to FIG. 1, a passenger cabin may include a plurality of cabin bays. As used herein, a "cabin bay" refers to a specific compartment within passenger cabin that may be used to transport passengers. Cabin bays may be within main body 104. Passenger cabin may include more than one cabin bay wherein each cabin bay may refer to a specific portion of passenger cabin. The more than one cabin bays may be separated by a structural element, wherein the structural element separates the one or more cabin bays into separate compartments. In some embodiments, a structural element separating cabin bays may include a wall. In some embodiments, a structural element separating cabin bays may include a series of pillars. In some embodiments, a structural element separating cabin bays may include a deep ceiling beam. In some embodiments, structural elements separating cabin bays may include windows wherein passenger in one cabin bay may interact with passengers of another cabin bay. In some embodiments, structural elements separating cabin bays may include doors allowing passengers to pass between cabin bays. In some embodiments, a structural element separating cabin bays may include a stiffener. In some embodiments, a passenger cabin may be divided into 2, 3, 4, 5, 6, 7, 8, 9, 10, or more cabin bays.

Still referring to FIG. 1, in some embodiments, a first cabin bay may be located in a front of passenger cabin, and a second cabin may be located in a rear of a passenger cabin. In some embodiments, a first cabin bay may be located on a right side of a passenger cabin, and a second cabin may be located on a left side of a passenger cabin. Exemplary passenger cabin layouts are provided in FIGS. 10-13.

Still referring to FIG. 1, in some embodiments, a cabin bay may include and/or be adjacent to a passenger door. As used herein, a "passenger door" is a door between the inside and outside of an aircraft used for passenger loading, passenger unloading, or both, in the course of routine passenger transportation. In some embodiments, each cabin bay may include a passenger door. In some embodiments, each cabin bay may include a plurality of passenger doors. A passenger door may be on main body 104. In some embodiments, passenger doors are located on opposites sides of main body 104. For example, one of the more than one passenger doors may be located on a left side of main body 104 and one of the more than one passenger doors may be located on a right side of main body 104. In some embodiments, a passenger door may be located on transition 112. In some embodiments, a plurality of passenger doors may be placed on BWB aircraft 100 such that a location of the plurality of passenger doors are symmetrical about an axis.

Still referring to FIG. 1, in some embodiments, a cabin bay may include and/or be adjacent to an emergency exit door. As used herein, an "emergency exit door" is a door between the inside and outside of an aircraft used by passengers that is not a passenger door. In some embodiments, each cabin bay may include an emergency exit door. In some embodiments, each cabin bay may include a plurality of emergency exit doors.

Still referring to FIG. 1, in some embodiments, a cabin bay may include and/or be adjacent to a lavatory. In some embodiments, each cabin bay may include a lavatory.

Still referring to FIG. 1, in some embodiments, a cabin bay may include an aisle. In some embodiments, an aisle may run longitudinally through the cabin bay. In some embodiments, an aisle may run laterally through the cabin bay.

Still referring to FIG. 1, in some embodiments, different cabin bays may have seats of different seat categories. In a non-limiting example, a first cabin bay may include business class seats, and a second cabin bay may include economy seats. In some embodiments, a cabin bay may include only seats of a first seat category, such as only first class seats. In some embodiments, a cabin bay may include seats of a plurality of seat categories, such as first class seats and business class seats. In some embodiments, multiple cabin bays may include seats in the same seat category. In a non-limiting example, a first cabin bay and a second bay may both include economy seats. In some embodiments, seat size, quality, and/or concentration may differ with seat category. In a non-limiting example, 4 economy seats may fit in the same amount of space as 3 business class seats.

Figure 2:
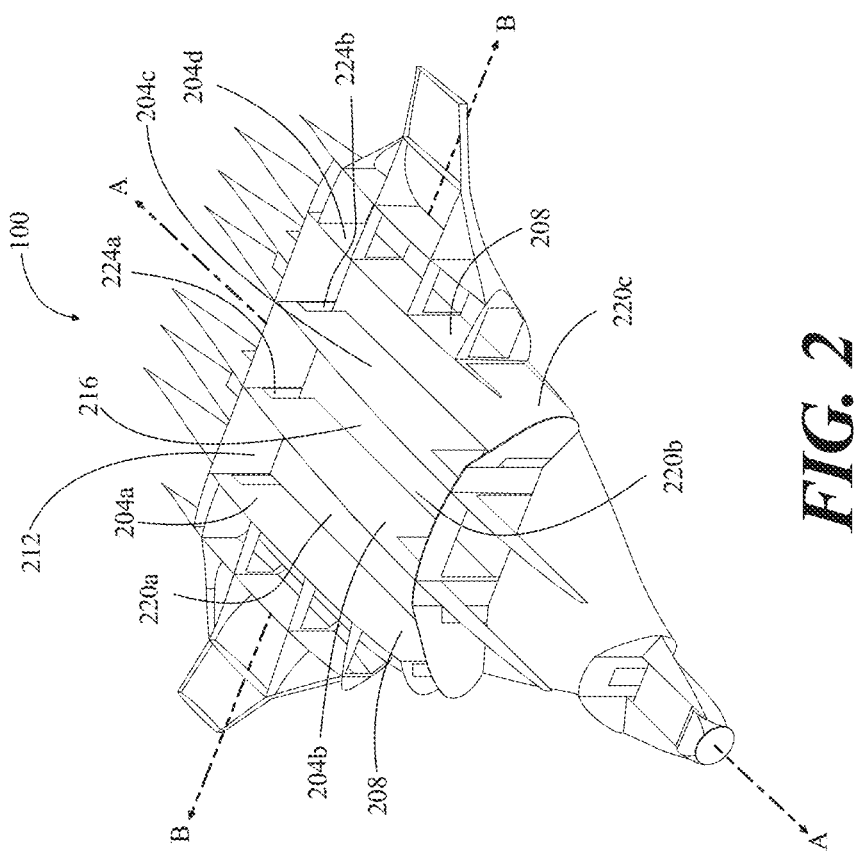
FIG. 2 is a schematic illustration of a top, front, and left perspective view of an exemplary blended wing body aircraft, depicting exemplary structural elements and cabin bays.
Figure 10:
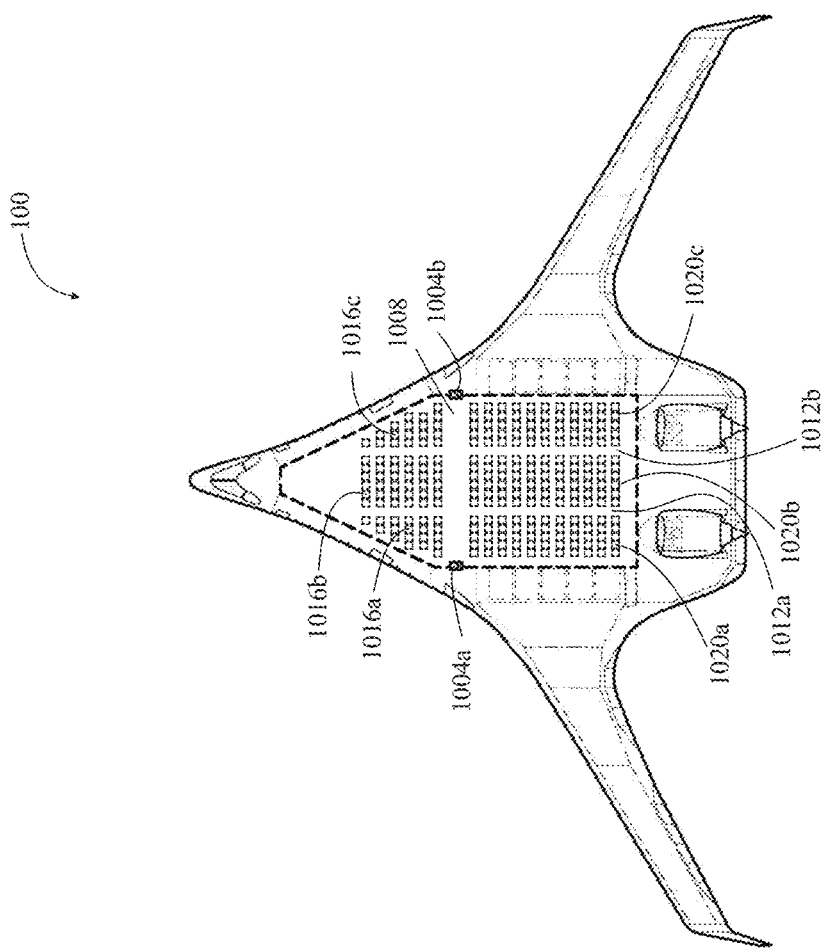
FIG. 10 is a schematic illustration of a top view of an exemplary blended wing body aircraft, showing an exemplary layout of a passenger cabin and passenger doors.

Still referring to FIG. 1, in some embodiments, a first cabin bay may include seats of a first seat category, a second cabin bay may include seats of a second seat category, and the first cabin bay and the second cabin bay may be lateral to each other (as in, moving along axis B in FIG. 2 may result in passing from the first cabin bay to the second cabin bay). Such cabin bays may be separated by a structural element that runs longitudinally through the passenger cabin, as shown in FIG. 10. In some embodiments, BWB aircraft 100 may include a first cabin bay including seats of a first seat category, a second cabin bay including seats of a second seat category, and a third cabin bay including seats of a third seat category, wherein the cabins are separated by two or more structural elements that run longitudinally through the passenger cabin.

Still referring to FIG. 1, in some embodiments, and without wishing to be limited by theory, longitudinal division of a passenger cabin may be more practical in blended wing body aircraft than tube and wing aircraft in part because tube and wing aircraft are typically long and thin, meaning separating a passenger cabin with a longitudinal division may result in extremely thin passenger bays, whereas blended wing body aircraft may include a flat sided pressure vessel that allows for a wider passenger cabin, meaning that longitudinal divisions may not result in extremely long and thin passenger bays. In some embodiments, longitudinal divisions of a blended wing body aircraft may additionally function as structural elements, connecting a first skin and/or structural element of a blended wing body aircraft to a second skin and/or structural element of a blended wing body aircraft (such as connecting the top and bottom of the aircraft), which may assist an aircraft skin and/or exterior structural elements in resisting and/or redistributing outward pressure caused by a higher pressure in a pressure vessel than outside the aircraft during flight.

Still referring to FIG. 1, in some embodiments, BWB aircraft 100 may include a passenger door. In some embodiments, BWB aircraft 100 may include a first passenger door on a first lateral side of BWB aircraft 100 (such as a right side) and a second passenger door on a second lateral side of BWB aircraft 100 (such as a left side). In some embodiments, BWB aircraft 100 may include a plurality of passenger doors on opposite lateral sides of BWB aircraft 100. In some embodiments, BWB aircraft may include 1, 2, 3, 4, 5, 6, 7, 8, 9, 10 or more passenger doors. In some embodiments, passenger door positions may be symmetrical about an axis and/or a plane. As a non-limiting example, in some embodiments, a set of passenger doors used for loading passengers onto an aircraft may be symmetrical with a set of passenger doors used for unloading passengers. In this example, a plane of symmetry may run through the center of the BWB aircraft, and may extend in the vertical and longitudinal directions.

Still referring to FIG. 1, in some embodiments, a passenger door may be on the leading edge of BWB aircraft 100. In some embodiments, a passenger door may be behind the leading edge of BWB aircraft 100. In some embodiments, a passenger door may be on a transition of BWB aircraft 100. In some embodiments, a passenger door may be behind a wing of BWB aircraft 100. In some embodiments, a BWB aircraft 100 may include a first passenger door on a leading edge of the aircraft and a second passenger door behind a wing of the aircraft. In some embodiments, inclusion of a plurality of passenger doors on each side of BWB aircraft 100 may improve loading and/or unloading efficiency, for example, because passengers may not all have to load and/or unload through the same bottleneck. In some embodiments, a passenger door may be substantially orthogonal to a lateral axis of BWB aircraft 100. In some embodiments, a passenger door may be angled such that the outside of the door faces a direction approximately 10 degrees, 20 degrees, 30 degrees, 40 degrees, 50 degrees, 60 degrees, 70 degrees, or 80 degrees toward the front of the aircraft from the lateral axis. In some embodiments, a passenger door may be angled such that the outside of the door faces a direction approximately 10 degrees, 20 degrees, 30 degrees, 40 degrees, 50 degrees, 60 degrees, 70 degrees, or 80 degrees toward the back of the aircraft from the lateral axis.

Still referring to FIG. 1, in some embodiments, a passenger door may be configured such that a passenger may pass from the interior of BWB aircraft 100 onto another surface by substantially horizontal movement, such as by using a jetway at an airport terminal that connects to a passenger door. In some embodiments, a passenger door may be configured such that a passenger may pass from the interior of BWB aircraft 100 to another surface above or below the level of the passenger cabin deck. In some embodiments, a passenger door may be configured such that a staircase, ladder, escalator, and the like may be used to transport passengers into and/or out of BWB aircraft 100. In some embodiments, a passenger door may include a port allowing a staircase, ladder, escalator, or the like to dock such that passengers may travel to and/or from BWB aircraft 100 through the passenger door.

Still referring to FIG. 1, in some embodiments, BWB aircraft 100 may include a passenger loading door. As used herein, a "passenger loading door" is a passenger door used for loading passengers, and not used for unloading passengers, during routine passenger transportation. In some embodiments, a passenger loading door may be configured to open before loading. In some embodiments, BWB aircraft 100 may include directional indicators guiding passengers from a passenger loading door to passenger seating. In a non-limiting example, BWB aircraft 100 may be configured to play audio guiding passengers from a passenger loading door toward their seats during passenger loading. In another non-limiting example, BWB aircraft 100 may include signs indicating which aisle to travel down to reach specific passenger seats, wherein the signs are positioned such that they may be viewed by passengers entering the aircraft through a passenger loading door. In another non-limiting example, BWB aircraft 100 may include arrows and/or lights indicating the locations of specific passenger seats, wherein the arrows and/or lights indicate a path from a passenger loading door to one or more specific seats. In some embodiments, a passenger loading door may be positioned such that passengers may travel from an airport terminal onto BWB aircraft 100. In a non-limiting example, an airport terminal may include a gate bridge positioned in order to load passengers into a door on the front right side of an aircraft. In this example, a passenger loading door may be positioned on a front right side of BWB aircraft 100.

Still referring to FIG. 1, in some embodiments, BWB aircraft 100 may include a passenger unloading door. As used herein, a "passenger unloading door" is a passenger door used for unloading passengers, and not used for loading passengers, during routine passenger transportation. In some embodiments, a passenger unloading door may be configured to open before unloading. In some embodiments, BWB aircraft 100 may include directional indicators guiding passengers from passenger seating toward a passenger unloading door. In a non-limiting example, BWB aircraft 100 may be configured to play audio guiding passengers from passenger seating toward a passenger unloading door during passenger unloading. In another non-limiting example, BWB aircraft 100 may include signs indicating which aisle to travel down to reach a passenger unloading door. In another non-limiting example, BWB aircraft 100 may include arrows and/or lights indicating the locations of a passenger unloading door.

Still referring to FIG. 1, in some embodiments, one or more passenger doors on a first lateral side of BWB aircraft 100 may be passenger loading doors, and one or more passenger doors on a second lateral side of BWB aircraft 100 may be passenger unloading doors, wherein the first lateral side and the second lateral side are opposite sides.

Still referring to FIG. 1, in some embodiments, a passenger door is in front of all passenger seats in a passenger cabin. In some embodiments, a passenger door is behind all passenger seats in a passenger cabin.

Still referring to FIG. 1, in some embodiments, BWB aircraft 100 may include a lateral aisle. As used herein, a "lateral aisle" is a passenger cabin aisle that runs parallel to the lateral axis of a BWB aircraft. In some embodiments, a passenger door may be connected to an aisle. In some embodiments, a passenger door may be at an end of a lateral aisle. In some embodiments, a lateral aisle may be positioned between two passenger doors. In some embodiments, a lateral aisle may run from a first passenger door, used for passenger loading, to a second passenger door, used for passenger unloading. In some embodiments, a lateral aisle may form a straight line, such as a straight line from a first passenger door to a second passenger door. In some embodiments, a lateral aisle may not form a straight line. In non-limiting examples, a lateral aisle may be curved in order to travel along an edge of a passenger cabin and/or in order to optimize a number of seats in a passenger cabin. In some embodiments, each passenger door is connected to a lateral aisle. In some embodiments, a lateral aisle may run the entire length of a passenger cabin in a lateral direction. In some embodiments, BWB aircraft 100 may include 1, 2, 3, 4, 5, 6, 7, 8, 9, 10, or more lateral aisles.

Still referring to FIG. 1, in some embodiments, BWB aircraft 100 may include a longitudinal aisle. As used herein, a "longitudinal aisle" is a passenger cabin aisle that runs parallel to the longitudinal axis of a BWB aircraft. In some embodiments, a lateral aisle may form a straight line, such as a straight line from a first passenger door to a second passenger door. In some embodiments, a lateral aisle may not form a straight line. In non-limiting examples, a lateral aisle may be curved in order to travel along an edge of a passenger cabin and/or in order to optimize a number of seats in a passenger cabin. In some embodiments, a longitudinal aisle may be connected to a lateral aisle. In some embodiments, a longitudinal aisle may run the entire length of a passenger cabin in a longitudinal direction. In some embodiments, BWB aircraft may include 1, 2, 3, 4, 5, 6, 7, 8, 9, 10, or more longitudinal aisles.

Still referring to FIG. 1, in some embodiments, BWB aircraft 100 may include a slanted aisle. In some embodiments, a slanted aisle may run orthogonal to a leading edge of BWB aircraft 100, from a passenger door to another aisle such as a lateral or longitudinal aisle. In some embodiments, a slanted aisle may be mirrored on the other lateral side of BWB aircraft 100.

Still referring to FIG. 1, BWB aircraft 100 may include a structural element. As used herein, a "structural element" of a BWB aircraft is a support configured to resist pressurization loads of the main body of the BWB aircraft and reduce skin bending loads. In some embodiments, a structural element may include a load-bearing component of a frame of an aircraft. In some embodiments, a structural element may reduce and/or redistribute pressures or loads experienced by a vessel structure (e.g., airframe) of an aircraft during operation. In some embodiments, a structural element may strengthen BWB aircraft 100 and prevent buckling of skin 124.

Still referring to FIG. 1, a structural element may include an interior structural element. As used herein, an "interior structural element" of a BWB aircraft is a structural element that does not form part of the exterior wall of the aircraft. In some embodiments, an interior structural element may include struts, beams, formers, stringers, longerons, interstitials, ribs, structural skin, straps, spars, panels, pillars, and the like.

Still referring to FIG. 1, in some embodiments, an interior structural element may extend vertically from a lower surface of main body 104 toward an upper surface of main body 104. In some embodiments, an interior structural element may extend laterally or longitudinally along passenger cabin. In some embodiments, interior structural element may be made of aluminum, carbon fiber or a similar material suitable for aircraft or high-pressure environments requiring lighter materials.

Still referring to FIG. 1, BWB aircraft 100 may include an exterior structural element. As used herein, an "exterior structural element" of a BWB aircraft is a structural element that forms part of the exterior wall of the aircraft. In some embodiments, an exterior structural element, together with an aircraft skin 124, may be configured to contain a pressure vessel. As used herein, a "pressure vessel" is a closed container designed to hold gasses at a pressure substantially different than that of the surrounding atmosphere. Pressure vessel in this disclosure may refer to main body 104 wherein main body 104 is designed to hold a gas, such as air within main body 104 at a pressure substantially different than the surrounding atmosphere. In some embodiments, pressure may be substantially greater inside BWB aircraft 100 than outside, when BWB aircraft 100 is flying at high altitudes. In some embodiments, an exterior structural element may be configured to contain a pressure vessel such that the exterior of BWB aircraft 100 does not bend due to a pressure differential. In some embodiments, an exterior structural element may further be configured to contain a pressure vessel such that the exterior structural element may prevent a balancing of pressure vessel with the ambient atmosphere, such as due to gas exchange between the pressure vessel and the outside atmosphere.

Still referring to FIG. 1, BWB aircraft 100 may include a plurality of materials, alone or in combination, in its construction. In some embodiments, an exterior structural element of BWB aircraft 100 may include a welded steel tube frame. In some embodiments, a welded steel tube frame may include metal alloys, including but not limited to manganese, nickel, copper, molybdenum, silicon, and/or aluminum alloys. In some embodiments, a welded steel tube frame may be contained within an aircraft skin 124. In some embodiments, an aircraft skin 124 may be constructed from carbon fiber, fiberglass panels, cloth-like materials, aluminum sheeting, and the like. In some embodiments, exterior structural elements and sections of an aircraft skin 124 may be connected using mechanical fasteners including, but not limited to, screws, nuts and bolts, anchors, clips, welding, brazing, crimping, nails, blind rivets, pull-through rivets, pins, dowels, snap-fits, clamps, and the like. BWB aircraft 100 may use wood or another suitably strong yet light material for an internal structure.

Still referring to FIG. 1, a structural element may include a truss structure. A truss structure may be used with a lightweight aircraft. A truss structure may include welded steel tube trusses. As used herein, a "truss" is an assembly of beams that create a rigid structure, for example without limitation including combinations of triangles to create three-dimensional shapes. A truss structure may include wood construction in place of steel tubes, or a combination thereof. In some embodiments, structural elements may comprise steel tubes and/or wood beams. An aircraft skin 124 may be layered over a body shape constructed by trusses. Aircraft skin 124 may include a plurality of materials such as plywood sheets, aluminum, fiberglass, and/or carbon fiber.

Still referring to FIG. 1, in some embodiments, at least a fuselage may comprise geodesic construction. Geodesic structural elements may include stringers wound about formers (which may be alternatively called station frames) in opposing spiral directions. As used herein, a "stringer" is a structural element that includes a long, thin, and rigid strip of metal or wood that is mechanically coupled to and spans the distance from, station frame to station frame to create an internal skeleton on which to mechanically couple aircraft skin. A former (or station frame) may include a rigid structural element that is disposed along a length of an interior of a fuselage orthogonal to a longitudinal (nose to tail) axis of BWB aircraft 100. In some embodiments, a former forms a general shape of at least a fuselage. A former may include differing cross-sectional shapes at differing locations along a fuselage, as the former is a structural component that informs an overall shape of the fuselage. In some embodiments, aircraft skin 124 may be anchored to formers and/or strings such that an outer mold line of volume encapsulated by the formers and stringers includes a same shape as BWB aircraft 100 when installed. In other words, former(s) may form a fuselage's ribs, and stringers may form interstitials between the ribs. A spiral orientation of stringers about formers may provide uniform robustness at any point on an aircraft fuselage such that if a portion sustains damage, another portion may remain largely unaffected. Aircraft skin 124 may be mechanically coupled to underlying stringers and formers and may interact with a fluid, such as air, to generate lift and perform maneuvers.

Still referring to FIG. 1, in some embodiments, a fuselage may comprise monocoque construction. Monocoque construction may include a primary structure that forms a shell (or skin in an aircraft's case) and supports physical loads. Monocoque fuselages may include fuselages in which the aircraft skin or shell may also include a primary structure. In some embodiments, a monocoque construction aircraft skin may support tensile and compressive loads within itself. In some embodiments, true monocoque aircraft may be characterized by an absence of internal structural elements. Aircraft skin in this construction method may be rigid and can sustain its shape with substantially no structural assistance form underlying skeleton-like elements. Monocoque fuselage may include, in non-limiting examples, aircraft skin made from plywood layered in varying grain directions, epoxy-impregnated fiberglass, carbon fiber, or a combination thereof.

Still referring to FIG. 1, according to some embodiments, a fuselage may include a semi-monocoque construction. In semi-monocoque construction, a fuselage may derive some structural support from stressed aircraft skin and some structural support from underlying frame structure made of structural components. Formers or station frames may be seen running transverse to a long axis of fuselage with circular cutouts which may be used in real-world manufacturing for weight savings and for routing of electrical harnesses and other modern on-board systems. In a semi-monocoque construction, stringers may be thin, long strips of material that run parallel to a fuselage's long axis. Stringers may be mechanically coupled to formers permanently, such as with rivets. Aircraft skin may be mechanically coupled to stringers and formers permanently, such as by rivets. A person of ordinary skill in the art will appreciate that there are numerous methods for mechanical fastening of the aforementioned components such as screws, nails, dowels, pins, anchors, adhesives like glue or epoxy, or bolts and nuts. According to some embodiments, a subset of semi-monocoque construction may be unibody construction. Unibody, which is short for "unitized body" or alternatively "unitary construction", vehicles are characterized by a construction in which body, floor plan, and chassis form a single structure, for example an automobile. In some embodiments, a unibody aircraft may include structural elements, such as formers and stringers, constructed in one piece, integral to an aircraft skin. In some embodiments, stringers and formers may account for a bulk of any aircraft structure (excluding monocoque construction). Stringers and formers may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin may be transferred to stringers. Location of said stringers greatly informs type of forces and loads applied to each and every stringer, all of which may be accounted for through design processes including, material selection, cross-sectional area, and mechanical coupling methods of each member. Similar methods may be performed for former assessment and design. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

Still referring to FIG. 1, in some cases, a primary purpose for a substructure of a semi-monocoque structure is to stabilize a skin. Typically, aircraft structure is required to have a very light weight and as a result, in some cases, aircraft skin may be very thin. Unless supported, a thin skin structure may tend to buckle and/or cripple under compressive and/or shear loads. In some embodiments, internal structural elements may be configured to stabilize skins. In some embodiments, deformations are prevented with internal structural elements such as ribs that support stringers which stabilize the skin.

Still referring to FIG. 1, in some embodiments, another common structural form is sandwich structure. As used herein, a "sandwich structure" is a skin structure having an inner and outer skin separated and stabilized by a core material. In some cases, sandwich structure may additionally include some number of ribs or frames. In some cases, sandwich structure may include metal, polymer, and/or composite. In some cases, core material may include honeycomb, foam plastic, and/or end-grain balsa wood. In some embodiments, sandwich structure may not use stringers, and sandwich structure may allow number of ribs or frames to be reduced, for instance in comparison with a semi-monocoque structure. In some cases, sandwich structure may be suitable for smaller, possibly unmanned, unpressurized blended wing body aircraft.

Still referring to FIG. 1, stressed skin, when used in semi-monocoque construction, may bear partial, yet significant, load. In other words, an internal structure, whether it be a frame of welded tubes, formers and stringers, or some combination, is not sufficiently strong enough by design to bear all loads. The concept of stressed skin is applied in monocoque and semi-monocoque construction methods of at least a fuselage and/or BWB 604. In some cases, monocoque may be considered to include substantially only structural skin, and in that sense, aircraft skin undergoes stress by applied aerodynamic fluids imparted by fluid. Stress as used in continuum mechanics may be described in pound-force per square inch ($lbf/in^6$) or Pascals (Pa). In semi-monocoque construction stressed skin bears part of aerodynamic loads and additionally imparts force on an underlying structure of stringers and formers.

Still referring to FIG. 1, BWB aircraft 100 may include monocoque or semi-monocoque construction. BWB aircraft 100 may include carbon fiber. In some embodiments, BWB aircraft 100 may include carbon fiber reinforced polymer, carbon fiber reinforced plastic, or carbon fiber reinforced thermoplastic (e.g., CFRP, CRP, CFRTP, carbon composite, or just carbon, depending on industry). As used herein, "carbon fiber," is a composite material including a polymer reinforced with carbon. In some embodiments, carbon fiber composites consist of two parts, a matrix and a reinforcement. In some embodiments, in carbon fiber reinforced plastic, the carbon fiber constitutes the reinforcement, which provides strength. The matrix can include a polymer resin, such as epoxy, to bind reinforcements together. Such reinforcement achieves an increase in CFRP's strength and rigidity, measured by stress and elastic modulus, respectively. In embodiments, carbon fibers themselves can each comprise a diameter between 5-10 micrometers and include a high percentage (i.e. above 85%) of carbon atoms. In some embodiments, carbon fiber materials provide high stiffness, high tensile strength, low weight, high chemical resistance, high temperature tolerance, and low thermal expansion. In some embodiments, carbon fibers may be combined with other materials to form a composite; when permeated with plastic resin and baked, carbon fiber reinforced polymer becomes extremely rigid. In embodiments, carbon fibers may additionally, or alternatively, be composited with other materials such as graphite to form reinforced carbon-carbon composites, which include high heat tolerances over 6000° C. A person of skill in the art will appreciate that aerospace applications may require high-strength, low-weight, high heat resistance materials in a plurality of roles, such as without limitation fuselages, fairings, control surfaces, and structures, among others.

Still referring to FIG. 1, in some embodiments, BWB aircraft 100 may contain landing gear located on an undercarriage of BWB aircraft 100. As used herein, "landing gear" refers to the components of an aircraft that supports and controls an aircraft when the aircraft is taking off, landing or parked. For example, landing gear may include an aircraft wheel wherein the aircraft wheel may be used to move the flight aircraft while the aircraft is on ground. Landing gear may include aircraft wheels, aircraft brakes, landing struts, shock absorbers, retractable gear, and the like.

Still referring to FIG. 1, in some embodiments, aft mounted main landing gear may be positioned sufficiently close to the rear of the aircraft to prevent the aircraft from tipping backwards. In some embodiments, aircraft tipping may be prevented by positioning of the aft mounted landing gear sufficiently close to the rear of the aircraft, even when passenger weight is distributed toward the rear of the aircraft. As a non-limiting example, passenger weight may be distributed toward the rear of the aircraft when passengers are seated in the aft portion of the aircraft before they are seated in the forward portion of the aircraft.

Still referring to FIG. 1, at least a flight component may include one or more devices configured to affect BWB aircraft 100's attitude. "Attitude", for the purposes of this disclosure, is the relative orientation of a body, in this case BWB aircraft 100, as compared to earth's surface or any other reference point and/or coordinate system. In some cases, attitude may be displayed to pilots, personnel, remote users, or one or more computing devices in an attitude indicator, such as without limitation a visual representation of a horizon and its relative orientation to BWB aircraft 100. A plurality of attitude datums may indicate one or more measurements relative to an aircraft's pitch, roll, yaw, or throttle compared to a relative starting point. One or more sensors may measure or detect an BWB aircraft 100's attitude and establish one or more attitude datums. An "attitude datum", for the purposes of this disclosure, refers to at least an element of data identifying an attitude of an BWB aircraft 100.

Still referring to FIG. 1, in some cases, BWB aircraft 100 may include one or more of an angle of attack sensor and a yaw sensor. In some embodiments, one or more of an angle of attack sensor and a yaw sensor may include a vane (e.g., wind vane). In some cases, vane may include a protrusion on a pivot with an aft tail. The protrusion may be configured to rotate about pivot to maintain zero tail angle of attack. In some cases, pivot may turn an electronic device that reports one or more of angle of attack and/or yaw, depending on, for example, orientation of the pivot and tail. Alternatively or additionally, in some cases, one or more of angle of attack sensor and/or yaw sensor may include a plurality of pressure ports located in selected locations, with pressure sensors located at each pressure port. In some cases, differential pressure between pressure ports can be used to estimate angle of attack and/or yaw.

Still referring to FIG. 1, in some embodiments, BWB aircraft 100 may include at least a pilot control. As used in this disclosure, a "pilot control," is an interface device that allows an operator, human or machine, to control a flight component of an aircraft. Pilot control may be communicatively connected to any other component presented in BWB aircraft 100; the communicative connection may include redundant connections configured to safeguard against single-point failure. In some cases, a plurality of attitude datums may indicate a pilot's instruction to change heading and/or trim of an BWB aircraft 100. Pilot input may indicate a pilot's instruction to change an aircraft's pitch, roll, yaw, throttle, and/or any combination thereof. Aircraft trajectory may be manipulated by one or more control surfaces and propulsors working alone or in tandem consistent with the entirety of this disclosure. As used herein, "pitch" is an aircraft's angle of attack, which is a difference between a plane including at least a portion of both wings of the aircraft running nose to tail and a horizontal flight trajectory. For example, an aircraft may pitch "up" when its nose is angled upward compared to horizontal flight, as in a climb maneuver. In another example, an aircraft may pitch "down", when its nose is angled downward compared to horizontal flight, like in a dive maneuver. In some cases, angle of attack may not be used as an input, for instance pilot input to any system disclosed herein; in such circumstances proxies may be used such as pilot controls, remote controls, or sensor levels, such as true airspeed sensors, pitot tubes, pneumatic/hydraulic sensors, and the like. As used herein, "roll" is an aircraft's position about its longitudinal axis, which is to say that when an aircraft rotates about its axis from its tail to its nose, and one side rolls upward, as in a banking maneuver. As used herein, "yaw" is an aircraft's turn angle, when an aircraft rotates about an imaginary vertical axis intersecting center of earth and BWB aircraft 100. As used herein, "throttle" is an aircraft outputting an amount of thrust from a propulsor. In context of a pilot input, throttle may refer to a pilot's input to increase or decrease thrust produced by at least a propulsor 120. Flight components may receive and/or transmit signals, for example an aircraft command signal. Aircraft command signal may include any signal described in this disclosure, such as without limitation electrical signal, optical signal, pneumatic signal, hydraulic signal, and/or mechanical signal. In some cases, an aircraft command may be a function of a signal from a pilot control. In some cases, an aircraft command may include or be determined as a function of a pilot command. For example, aircraft commands may be determined as a function of a mechanical movement of a throttle. Signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Pilot control may include circuitry, computing devices, electronic components or a combination thereof that translates pilot input into a signal configured to be transmitted to another electronic component. In some cases, a plurality of attitude commands may be determined as a function of an input to a pilot control. A plurality of attitude commands may include a total attitude command datum, such as a combination of attitude adjustments represented by one or a certain number of combinatorial datums. A plurality of attitude commands may include individual attitude datums representing total or relative change in attitude measurements relative to pitch, roll, yaw, and throttle.

Still referring to FIG. 1, in some embodiments, pilot control may include at least a sensor. In some cases, a sensor may detect a phenomenon and transmit a signal that is representative of the phenomenon. At least a sensor may include, torque sensor, gyroscope, accelerometer, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. For the purposes of the disclosure, a "torque datum" is one or more elements of data representing one or more parameters detailing power output by one or more propulsors, flight components, or other elements of an electric aircraft. A torque datum may indicate the torque output of at least a flight component. At least a flight component may include any propulsor 120 as described herein. In embodiment, at least a flight component may include an electric motor, propeller, jet engine, rotor, turbine, or any other mechanism configured to manipulate a fluid medium to propel an aircraft as described herein. In an embodiment, at least a sensor may be included in a sensor suite. In some embodiments, BWB aircraft 100 may include a plurality of sensors in the form of individual sensors or a sensor suite working in tandem or individually. A sensor suite may include a plurality of independent sensors, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a battery management system and/or user to detect phenomenon is maintained and in a non-limiting example, a user alter aircraft usage pursuant to sensor readings.

Still referring to FIG. 1, at least a sensor may include a moisture sensor. Moisture may include humidity. An amount of water vapor contained within a parcel of air can vary significantly. Water vapor is generally invisible to the human eye and may be damaging to electrical components. In some embodiments, a humidity sensor may measure absolute humidity, relative humidity, and/or specific humidity. As used herein, "absolute humidity" is a measurement describing the water content of air and is expressed in either grams per cubic meters or grams per kilogram. As used herein, "relative humidity" is a measurement of absolute humidity relative to a maximum humidity given the same temperature. In some embodiments, relative humidity may be expressed as a percentage. As used herein, "specific humidity" is the ratio of water vapor mass to total moist air parcel mass, where parcel is a given portion of a gaseous medium. A moisture sensor may include a psychrometer. A moisture sensor may include a hygrometer. A moisture sensor may be configured to act as or include a humidistat. As used herein, a "humidistat" is a humidity-triggered switch, often used to control another electronic device. A moisture sensor may use capacitance to measure relative humidity and include in itself, or as an external component, include a device to convert relative humidity measurements to absolute humidity measurements. As used herein, "capacitance" is the ability of a system to store an electric charge, in this case the system is a parcel of air which may be near, adjacent to, or above a battery cell.

Still referring to FIG. 1, at least a sensor may include electrical sensors. An electrical sensor may be configured to measure voltage across a component, electrical current through a component, and resistance of a component. Electrical sensors may include separate sensors to measure each of the previously disclosed electrical characteristics such as voltmeter, ammeter, and ohmmeter, respectively. One or more sensors may be communicatively coupled to at least a pilot control, the manipulation of which, may constitute at least an aircraft command. Signals may include electrical, electromagnetic, visual, audio, radio waves, or another undisclosed signal type alone or in combination. At least a sensor communicatively connected to at least a pilot control may include a sensor disposed on, near, around or within at least pilot control. At least a sensor may include a motion sensor. As used herein, a "motion sensor" is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user may alter aircraft usage based on sensor readings.

Still referring to FIG. 1, BWB aircraft 100 may include an energy source. Energy source may include any device providing energy to at least a flight component, for example at least a propulsor 120. Energy source may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a battery, a capacitor, and/or inductor. An energy source and/or energy storage device may include at least a battery, battery cell, and/or a plurality of battery cells connected in series, in parallel, or in a combination of series and parallel connections such as series connections into modules that are connected in parallel with other like modules. Battery and/or battery cell may include, without limitation, Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode. In some embodiments, an energy source may be used to provide electrical power to an electric or hybrid propulsor 120 during moments requiring high rates of power output, including without limitation takeoff, landing, thermal de-icing and situations requiring greater power output for reasons of stability, such as high turbulence situations. In some cases, battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. A person of ordinary skill in the art, upon reviewing the entirety of this disclosure, will be aware of various devices of components that may be used as an energy source.

Still referring to FIG. 1, in some embodiments, an energy source may include a fuel store. In some cases, a fuel store may include a fuel tank. Fuel may include a liquid fuel, a gaseous fluid, a solid fuel, and fluid fuel, a plasma fuel, and the like. Exemplary non-limiting fuels include hydrocarbon fuels, petroleum-based fuels, synthetic fuels, chemical fuels, Jet fuels (e.g., Jet-A fuel, Jet-B fuel, and the like), kerosene-based fuel, gasoline-based fuel, an electrochemical-based fuel (e.g., lithium-ion battery), a hydrogen-based fuel, natural gas-based fuel, and the like. In some embodiments, fuel store may be located substantially within a wing portion of BWB aircraft 100. Aviation fuels may contain additives to enhance or maintain properties important to fuel performance or handling. Fuel may be kerosene-based (JP-8 and Jet A-1), for example for gas turbine-powered aircraft. Piston-engine aircraft may use gasoline-based fuels and/or kerosene-based fuels (for example for Diesel engines). In some cases, specific energy may be considered an important criterion in selecting fuel for BWB aircraft 100. Liquid fuel may include Jet-A. Presently Jet-A powers modern commercial airliners and is a mix of extremely refined kerosene and burns at temperatures at or above 49° C. (160° F.). In some embodiments, kerosene-based fuel has a much higher flash point than gasoline-based fuel, meaning that it requires significantly higher temperature to ignite.

Still referring to FIG. 1, BWB aircraft 100 may include an energy source which may include a fuel cell. As used in this disclosure, a "fuel cell" is an electrochemical device that combines a fuel and an oxidizing agent to create electricity. In some cases, fuel cells are different from most batteries in requiring a continuous source of fuel and oxygen (usually from air) to sustain the chemical reaction, whereas in a battery the chemical energy comes from metals and their ions or oxides that are commonly already present in the battery, except in flow batteries. Fuel cells can produce electricity continuously for as long as fuel and oxygen are supplied.

Still referring to FIG. 1, fuel cells may include an anode, a cathode, and an electrolyte that allows ions, often positively charged hydrogen ions (protons), to move between two sides of the fuel cell. At anode, a catalyst causes fuel to undergo oxidation reactions that generate ions (often positively charged hydrogen ions) and electrons. Ions move from anode to cathode through electrolyte. Concurrently, electrons may flow from anode to cathode through an external circuit, producing direct current electricity. At cathode, another catalyst causes ions, electrons, and oxygen to react, forming water and possibly other products. Fuel cells may be classified by type of electrolyte used and by difference in startup time ranging from 6 second for proton-exchange membrane fuel cells (PEM fuel cells, or PEMFC) to 10 minutes for solid oxide fuel cells (SOFC). In some cases, energy source may include a related technology, such as flow batteries. Within a flow battery fuel can be regenerated by recharging. Individual fuel cells produce relatively small electrical potentials, about 0.7 volts. Therefore, in some cases, fuel cells may be "stacked", or placed in series, to create sufficient voltage to meet an application's requirements. In addition to electricity, fuel cells may produce water, heat and, depending on the fuel source, very small amounts of nitrogen dioxide and other emissions. In some embodiments, energy efficiency of a fuel cell may be between 40% and 90%.

Still referring to FIG. 1, in some embodiments, fuel cell may include an electrolyte. In some cases, electrolyte may define a type of fuel cell. Electrolyte may include, in non-limiting examples, potassium hydroxide, salt carbonates, and phosphoric acid. In some embodiments, a fuel cell may be fueled by hydrogen. Fuel cell may feature an anode catalyst, like fine platinum powder, which breaks down fuel into electrons and ions. Fuel cell may feature a cathode catalyst, often nickel, which converts ions into waste chemicals, with water being the most common type of waste. In some embodiments, a fuel cell may include gas diffusion layers that are designed to resist oxidization.

Still referring to FIG. 1, BWB aircraft 100 may include an energy source which may include a cell such as a battery cell, or a plurality of battery cells forming a battery module. A battery module may include batteries connected in parallel or in series or a plurality of modules connected either in series or in parallel designed to deliver both the power and energy requirements of the application. Connecting batteries in series may increase the voltage of an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of an energy source may be based on the individual battery cell performance or an extrapolation based on the measurement of at least an electrical parameter. In an embodiment where an energy source includes a plurality of battery cells, the overall power output capacity may be dependent on the electrical parameters of each individual cell. If one cell experiences high self-discharge during demand, power drawn from an energy source may be decreased to avoid damage to the weakest cell. An energy source may further include, without limitation, wiring, conduit, housing, cooling system and battery management system.

Still referring to FIG. 1, BWB aircraft 100 may include multiple flight component sub-systems, each of which may have a separate energy source. For instance, and without limitation, one or more flight components may have a dedicated energy source. Alternatively, or additionally, a plurality of energy sources may each provide power to two or more flight components, such as, without limitation, a "fore" energy source providing power to flight components located toward a front of BWB aircraft 100, while an "aft" energy source provides power to flight components located toward a rear of the BWB aircraft 100. As a non-limiting example, a flight component of group of flight components may be powered by a plurality of energy sources. For example, and without limitation, two or more energy sources may power one or more flight components; two energy sources may include, without limitation, at least a first energy source having high specific energy density and at least a second energy source having high specific power density, which may be selectively deployed as required for higher-power and lower-power needs. Alternatively, or additionally, a plurality of energy sources may be placed in parallel to provide power to a single propulsor or plurality of propulsors. Alternatively, or additionally, two or more separate propulsion subsystems may be joined using intertie switches causing the two or more separate propulsion subsystems to be treatable as a single propulsion subsystem or system, for which potential under load of combined energy sources may be used as the electric potential. Persons skilled in the art, upon reviewing the entirety of this disclosure, will be aware of various combinations of energy sources that may each provide power to single or multiple propulsors in various configurations.

Now referring to FIG. 2, an exemplary embodiment of BWB aircraft 100, without skin 124, is shown in accordance with one or more embodiments. In some embodiments, structural elements of BWB aircraft 100 may include one or more longitudinal walls 204, which may run substantially parallel to a longitudinal axis A of BWB aircraft 100. For example, and without limitation, structural elements may include a plurality of walls 204. Plurality of walls 204 may include one or more walls, such as walls 204a-d. Each longitudinal wall 204a-d may extend from a top side of BWB aircraft 100 to a bottom side of BWB aircraft 100. In one or more embodiments, plurality of wall 204 may include at least a laterally outermost bulkhead 208 configured to resist cabin pressure. As used herein, a "laterally outermost bulkhead" is the last lateral pressure containing component of an airframe. The laterally outermost bulkhead may include the last bulkhead on a right side or a left side of an airframe. In one or more embodiments, BWB aircraft 100 may include an aft pressure bulkhead 212, located aft of cabin 216. Aft pressure bulkhead 212 may resist pressure loading between the atmosphere and the cabin at the aft of BWB aircraft 100. As used herein, an "aft pressure bulkhead" is a rear pressure containing component an airframe. Aft pressure bulkhead 212 may intersect one or more walls 204a-d. Aft pressure bulkhead 212 may be oriented substantially orthogonal to walls 204a-d. For example, and without limitation, aft pressure bulkhead may be positioned parallel to a lateral axis B of BWB aircraft 100. In one or more embodiments, aft pressure bulkhead 212 may attach with skin 124 at a top and bottom edge of aft pressure bulkhead 212.

Still referring to FIG. 2, BWB aircraft 100 may include a base 216, which extends over longitudinal axis A and lateral axis B of BWB aircraft 100. In one or more embodiments, structural components, such as, for example, longitudinal walls 204 may be attached to base 216. In some embodiments, structural components, such as, for example, walls 204, may traverse through base 216. For instance, and without limitation, base 216 may include an upper surface and a lower surface, where plurality of walls 204 are attached at one or more of upper surface of base 216 and lower surface of base 216. For the purposes of this disclosure, a "base" is a planar structural component that includes a platform, such as an integrated floor, which one or more other structural components may be mounted and/or attached to. For example, and without limitation, plurality of longitudinal walls 204a-d may run lengthwise along base 216 and extend from base 216 toward skin of aircraft, compartmentalizing cabin of fuselage into distinct compartments running longitudinally. In various embodiments, walls 204a-d may each be attached to a top surface of base 216 and extend toward skin. In various embodiments, base 216 may include supports, such as, for example, floor beams, that upper surface and/or lower surface may be attached to. In a nonlimiting embodiment, base 216 may include supports such as lateral floor beams and/or longitudinal stringers that each wall 204 may attach to. In some embodiments, one or more walls 204a-d may traverse through base 216 and extend from a bottom surface of base 216 to attach to an underside (e.g., bottom) of skin 124 to provide additional support to BWB aircraft 100. In one or more embodiments, two outermost (laterally) longitudinal ribs, such as walls 204a and 204d, may include pressure bulkheads, where a pressure bulkhead resists a pressure loading resulting from low ambient pressure and internal cabin pressure. Each longitudinal wall 204a-d may provide structural support for BWB aircraft 100. For instance, and without limitation, longitudinal walls 204a-d may provide resistance against wing bend moments, support of payload, resistance against skin buckling, resistance to loadings from air pressure, resistance to shear, tensile, and compression forces, and the like.

Still referring to FIG. 2, in some embodiments, structural elements such as longitudinal walls 204 may separate a passenger cabin into a plurality of bays, such as bays 220a, 220b, and 220c. In some embodiments, cabins may be connected by one or more doors, such as doors 224a and 224b.

Figure 3:
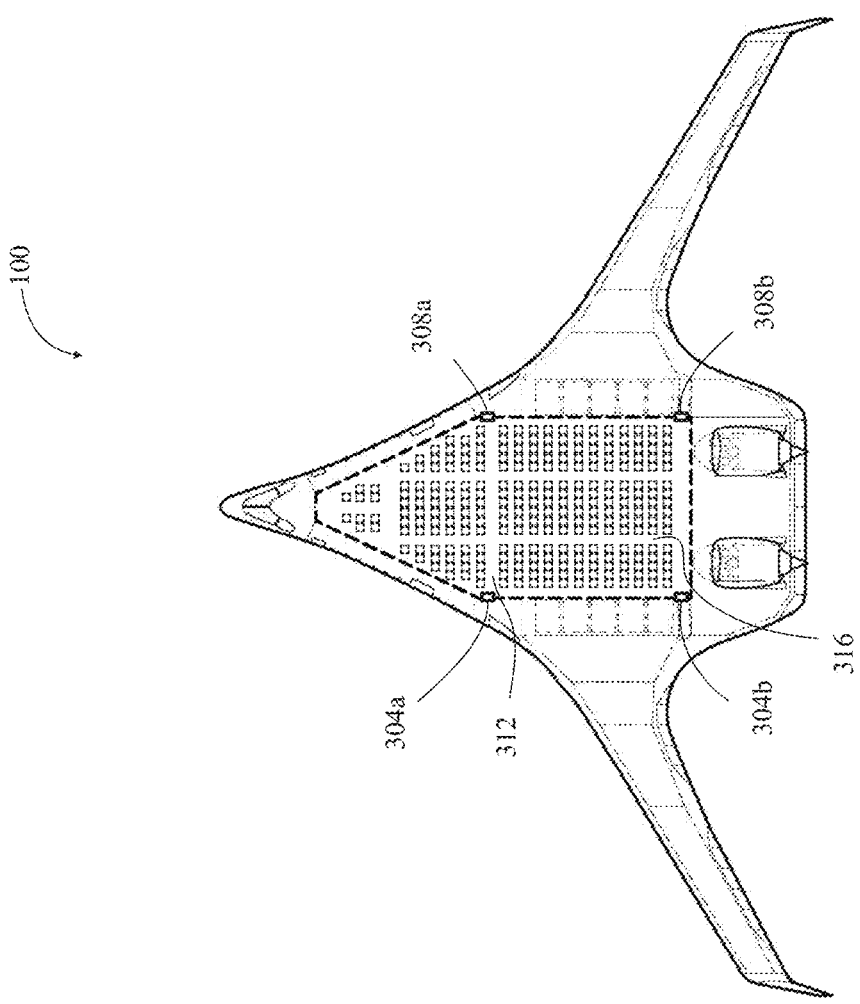
FIG. 3 is a schematic illustration of a top view of an exemplary blended wing body aircraft, showing an exemplary layout of a passenger cabin and passenger doors.

Now referring to FIG. 3, an exemplary layout of a passenger cabin of BWB aircraft 100 is illustrated. In some embodiments, BWB aircraft 100 may include a first passenger loading door 304a and a second passenger loading door 304b. In some embodiments, BWB aircraft 100 may include a first passenger unloading door 308a and a second passenger unloading door 308b. In some embodiments, BWB aircraft 100 may include a lateral aisle 312. In some embodiments, a lateral aisle and a passenger door may be positioned such that passengers may travel through the door using the aisle. In some embodiments, BWB aircraft 100 may include a longitudinal aisle 316. In some embodiments, a longitudinal aisle may be connected to a lateral aisle.

Figure 4:
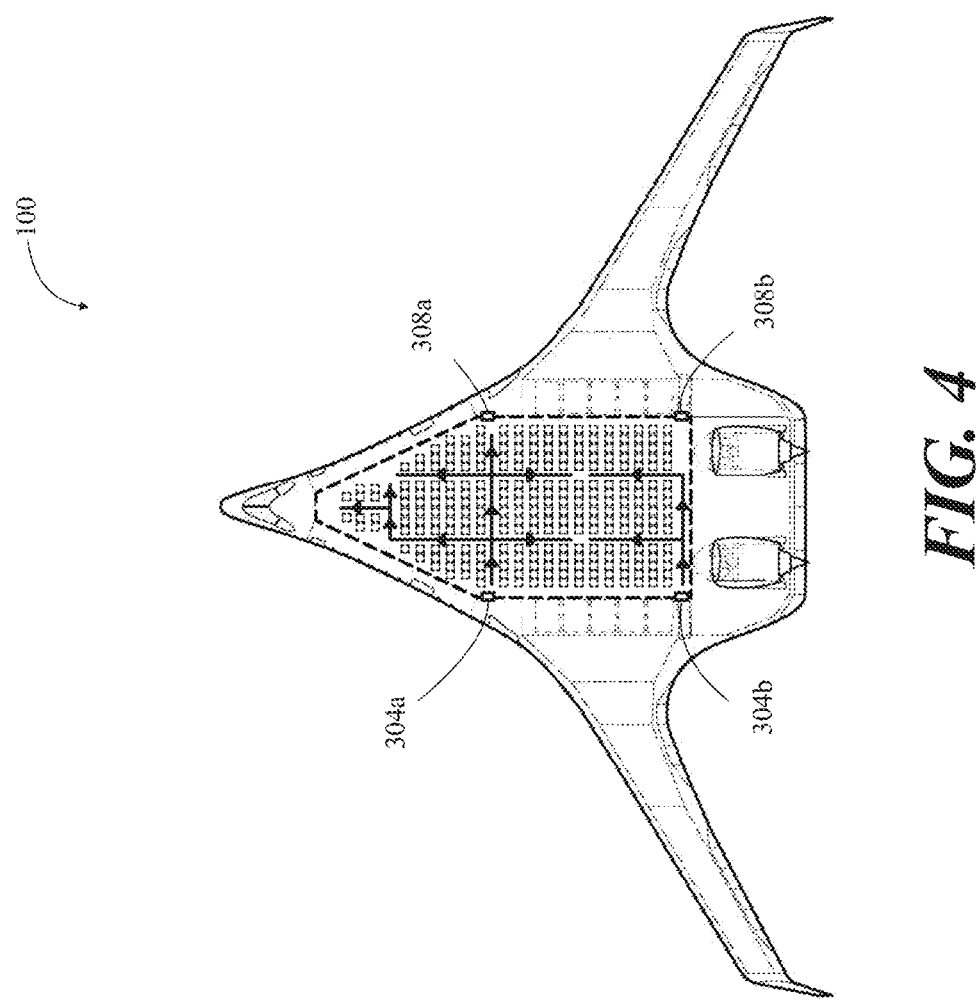
FIG. 4 is a schematic illustration of a top view of an exemplary blended wing body aircraft, showing an exemplary layout of a passenger cabin and passenger doors, and an exemplary passenger loading pattern.

Now referring to FIG. 4, an exemplary layout of a passenger cabin of BWB aircraft 100 is illustrated, depicting an exemplary pattern of loading passengers onto BWB aircraft 100 using passenger loading doors 304a and 304b.

Figure 5:
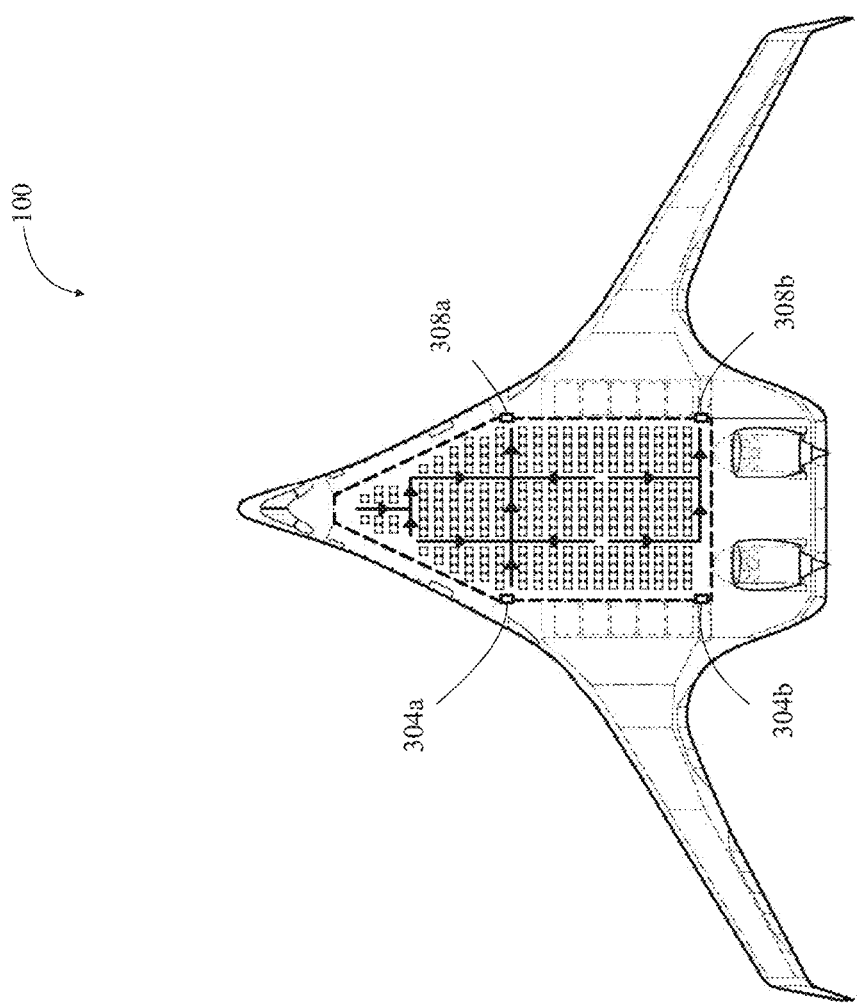
FIG. 5 is a schematic illustration of a top view of an exemplary blended wing body aircraft, showing an exemplary layout of a passenger cabin and passenger doors, and an exemplary passenger unloading pattern.

Now referring to FIG. 5, an exemplary layout of a passenger cabin of BWB aircraft 100 is illustrated, depicting an exemplary pattern of unloading passengers from BWB aircraft 100 using passenger unloading doors 308a and 308b.

Figure 6:
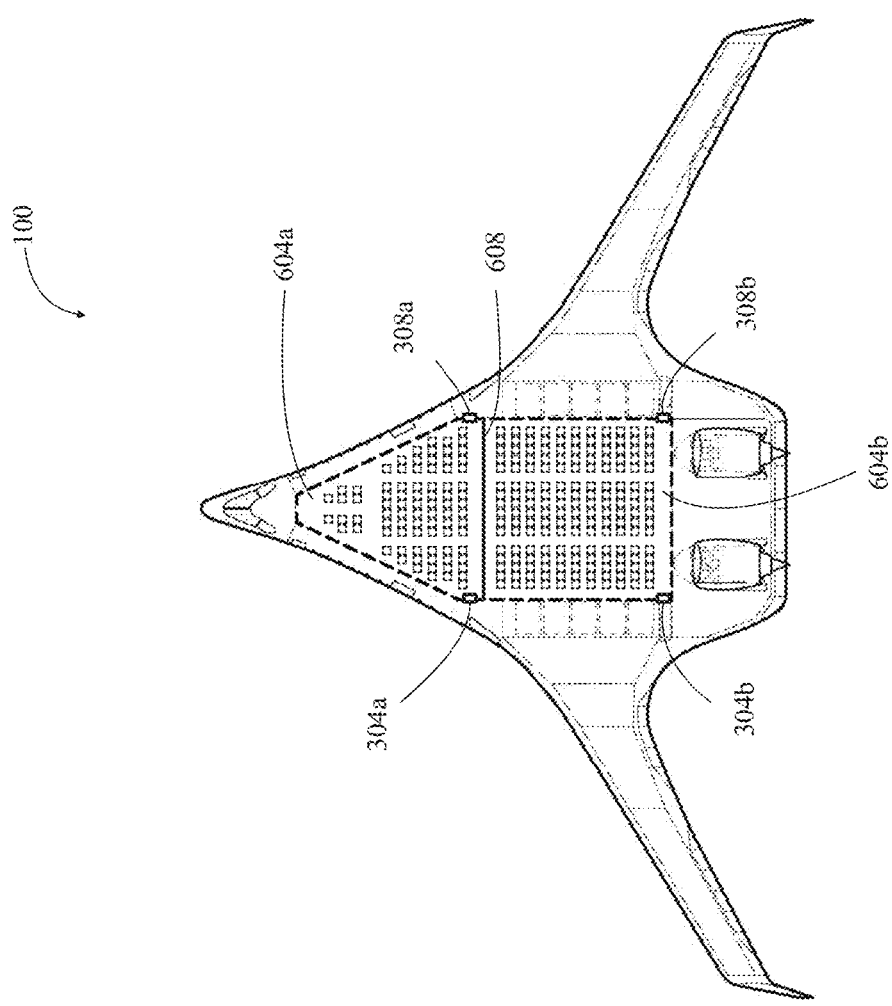
FIG. 6 is a schematic illustration of a top view of an exemplary blended wing body aircraft, showing an exemplary layout of a passenger cabin passenger doors in an exemplary BWB aircraft with multiple cabin bays.

Now referring to FIG. 6, an exemplary layout of a passenger cabin of BWB aircraft 100 is illustrated. In some embodiments, a passenger cabin may be divided into a plurality of cabin bays. In some embodiments, BWB aircraft 100 may include a first cabin bay 604a and a second cabin bay 604b. In some embodiments, two or more cabin bays may be separated by a structural element 608 such as a wall. In some embodiments, structural element 608 may include one or more doors and/or windows.

Figure 7:
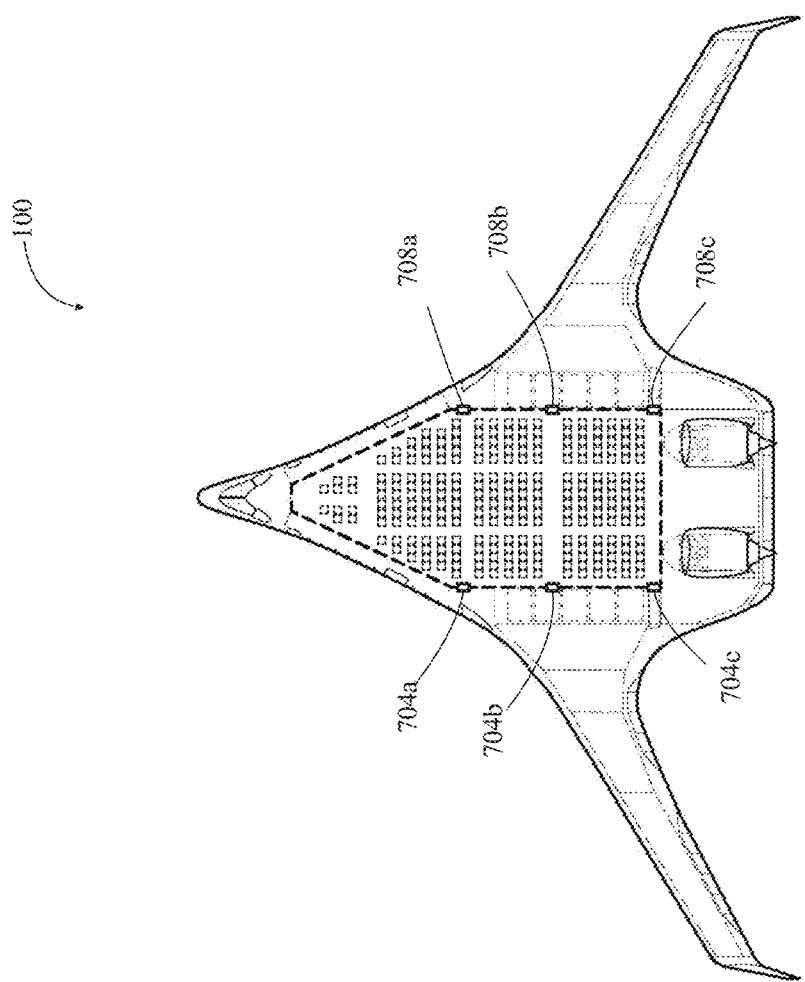
FIG. 7 is a schematic illustration of a top view of an exemplary blended wing body aircraft, showing an exemplary layout of a passenger cabin and passenger doors.

Now referring to FIG. 7, an exemplary layout of a passenger cabin of BWB aircraft 100 is illustrated. In some embodiments, BWB aircraft may include a first passenger loading door 704a, a second passenger loading door 704b, a third passenger loading door 704c, a first passenger unloading door 708a, a second passenger unloading door 708b, and a third passenger unloading door 708c.

Figure 8:
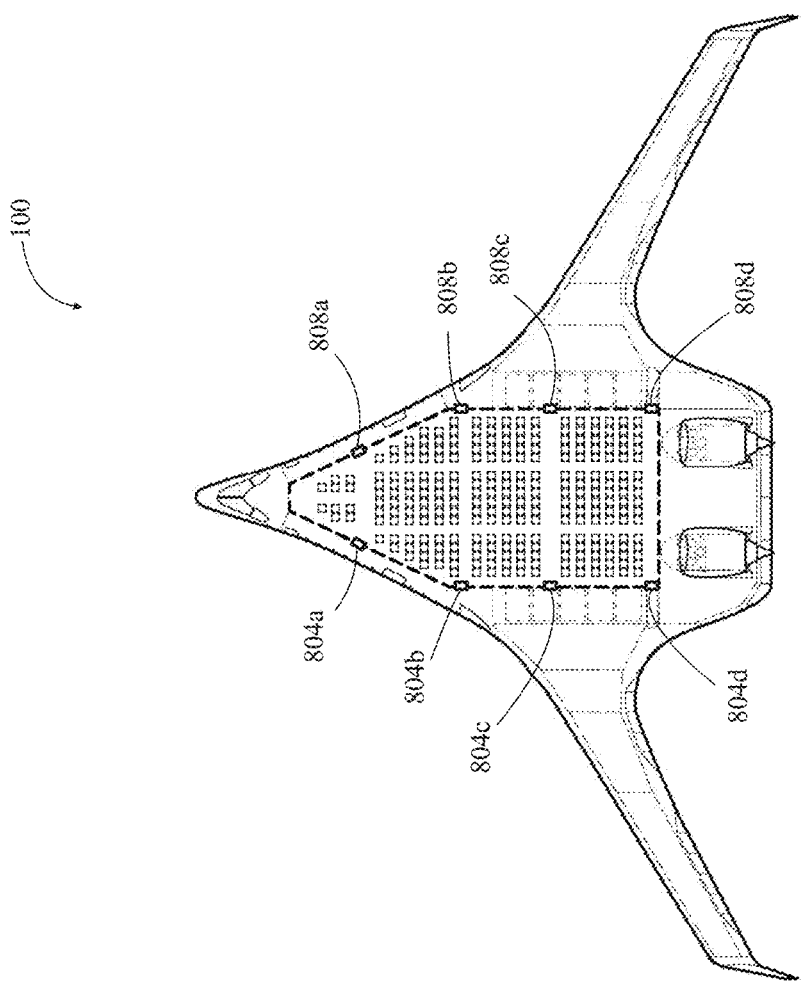
FIG. 8 is a schematic illustration of a top view of an exemplary blended wing body aircraft, showing an exemplary layout of a passenger cabin and passenger doors.

Now referring to FIG. 8, an exemplary layout of a passenger cabin of BWB aircraft 100 is illustrated. In some embodiments, BWB aircraft may include a first passenger loading door 804a, a second passenger loading door 804b, a third passenger loading door 804c, a fourth passenger loading door 804d, a first passenger unloading door 808a, a second passenger unloading door 808*b*, a third passenger unloading door 808*c* and a fourth passenger unloading door 808*d*.

Figure 9:
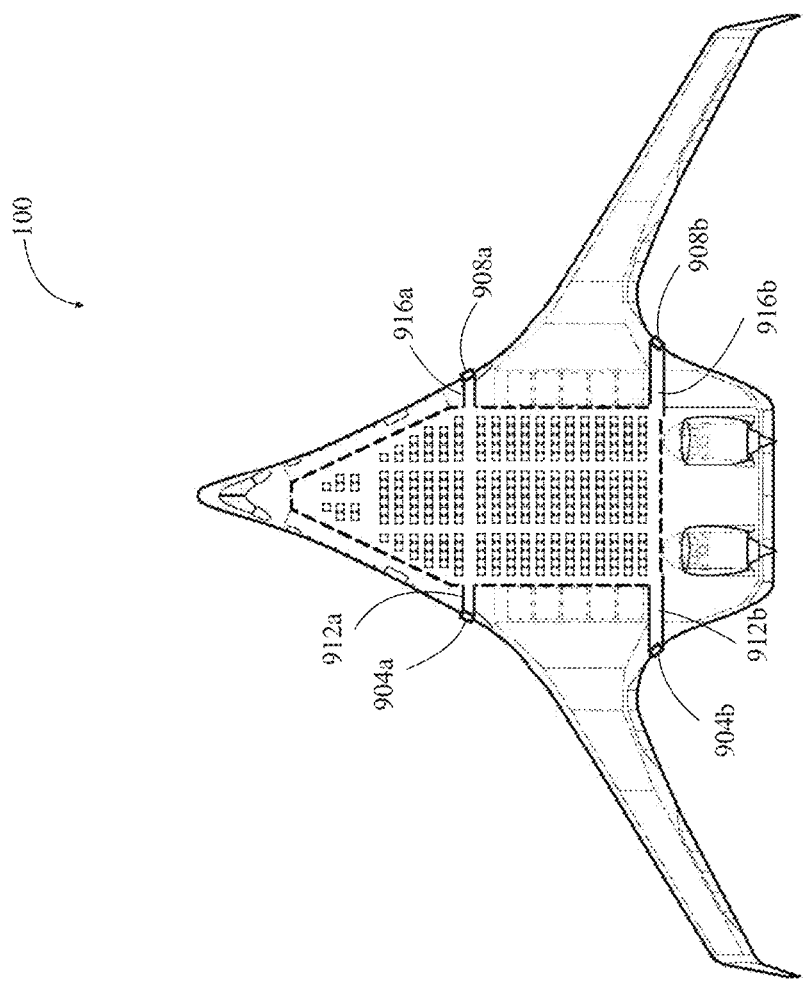
FIG. 9 is a schematic illustration of a top view of an exemplary blended wing body aircraft, showing an exemplary layout of a passenger cabin and passenger doors.

Now referring to FIG. 9, in some embodiments, a passenger door may be positioned on the outermost edge of the aircraft when viewed from above. In this figure, passenger loading doors 904*a* and 904*b* are on the outermost edge of the aircraft when viewed from above. In this figure, passenger unloading doors 908*a* and 908*b* are on the outermost edge of the aircraft when viewed from above. In some embodiments, a passenger door may be positioned such that it is on a surface of BWB aircraft 100 that is not on the outermost edge of the aircraft when viewed from above, as in FIGS. 3-8. In non-limiting examples, passenger doors may be positioned such that a passenger may enter and/or exit BWB aircraft 100 at an upward or downward angle.

Still referring to FIG. 9, in some embodiments, a passenger door may be positioned on a leading edge of BWB aircraft 100 (as in passenger doors 904*a* and 908*a*). In some embodiments, a passenger door may be positioned behind a leading edge of BWB aircraft 100 (as in passenger doors 904*b* and 908*b*). In some embodiments, a passenger door may be positioned behind a wing of BWB aircraft 100 (as in passenger doors 904*b* and 908*b*).

Still referring to FIG. 9, in some embodiments, a passenger loading door may be connected to a passenger cabin by a passenger loading path, such as passenger loading paths 912*a* and 912*b*. In some embodiments, a passenger unloading door may be connected to a passenger cabin by a passenger unloading path, such as passenger loading paths 916*a* and 916*b*.

Now referring to FIG. 10, an exemplary embodiment of BWB aircraft 100 is disclosed. BWB aircraft 100 may include passenger doors 1004*a* and 1004*b*. In some embodiments, passenger door 1004*a* may be used for loading and passenger door 1004*b* may be used for unloading. In some embodiments, BWB aircraft 100 may include lateral aisle 1008, where lateral aisle 1008 connects passenger door 1004*a* and passenger door 1004*b*. In some embodiments, BWB aircraft 100 may include one or more longitudinal aisles, such as longitudinal aisles 1012*a* and 1012*b*. In some embodiments, BWB aircraft 100 may include a plurality of forward passenger sections 1016, such as forward left passenger section 1016*a*, forward center passenger section 1016*b*, and forward right passenger section 1016*c*. In some embodiments, BWB aircraft 100 may include a plurality of back passenger sections, such as back left passenger section 1020*a*, back center passenger section 1020*b*, and back right passenger section 1020*c*.

Still referring to FIG. 10, in some embodiments, BWB aircraft 100 may be unloaded by passenger section. In a non-limiting example, BWB aircraft 100 may be unloaded in the following order: forward left passenger section 1016*a*, then forward center passenger section 1016*b*, then forward right passenger section 1016*c*, then back left passenger section 1020*a*, then back center passenger section 1020*b*, then back right passenger section 1020*c*. Such passenger sections may be unloaded by directing passengers to exit through passenger door 1004*b*. In some embodiments, as a passenger section finishes unloading, a cleaning crew may enter that passenger section and begin cleaning. Cleaning crew may enter through passenger door 1004*a*, so as not to conflict with exiting passengers. Cleaning crew may be sized to complete the process without delaying passenger loading. In some embodiments, as a passenger section finishes being cleaned, the cleaning crew may move on to the next passenger section, and passengers for the next flight may enter the cleaned passenger section. Such passengers may enter BWB aircraft 100 through passenger door 1004*a*.

Still referring to FIG. 10, in a non-limiting example, unloading process may start with passengers in section 1016*a* unloading through passenger door 1004*b*. Then, passengers in section 1016*b* exit through passenger door 1004*b*, and cleaning crew enters through passenger door 1004*a* and begins cleaning section 1016*a*. Then, passengers in section 1016*c* exit through passenger door 1004*b*, cleaning crew cleans section 1016*b*, and new passengers enter through passenger door 1004*a* and occupy section 1016*a* seats. Then, passengers in section 1020*a* exit through passenger door 1004*b*, cleaning crew cleans section 1016*c*, and new passengers enter through passenger door 1004*a* and occupy section 1016*b* seats. Then, passengers in section 1020*b* exit through passenger door 1004*b*, cleaning crew cleans section 1020*a*, and new passengers enter through passenger door 1004*a* and occupy section 1016*c* seats. Then, passengers in section 1020*c* exit through passenger door 1004*b*, cleaning crew cleans section 1020*b*, and new passengers enter through passenger door 1004*a* and occupy section 1020*a* seats. Then, cleaning crew cleans section 1020*c*, and new passengers enter through passenger door 1004*a* and occupy section 1020*b* seats. Then, cleaning crew exits through passenger door 1004*b*, and new passengers enter through passenger door 1004*a* and occupy section 1020*c* seats. In this way, BWB aircraft 100 may be cleaned and loaded behind unloading passengers, such that cleaning crew and loading passengers do not interfere with unloading passengers. In some embodiments, such a loading and unloading process may improve loading and unloading efficiency, reducing the amount of time between flights.

Still referring to FIG. 10, in some embodiments, loading and unloading process may also include one or more of the following steps: old pilots unload; new pilots load; old cabin attendants unload; new cabin attendants load; galleys are serviced. In some embodiments, BWB aircraft 100 may include a second passenger loading door. In some embodiments, BWB aircraft 100 may include two or more passenger loading doors and only one passenger unloading door. In some embodiments, pilots and cabin attendants may be exchanged through a passenger loading door and galleys may be serviced using a passenger loading door. For example, pilots and cabin attendants may be exchanged and galleys may be serviced using a passenger loading door that is not currently being used by exiting passengers. In some embodiments, pilots and cabin attendants may be exchanged and galleys may be serviced using passenger door 1004*b* after all old passengers have unloaded but before all new passengers have finished loading.

Still referring to FIG. 10, in some embodiments, passengers may be directed to unload. In a non-limiting example, passengers may be directed to unload using lights, such as green lights meaning unload and red lights meaning remain seated. In another non-limiting example, passengers may be directed to unload using sounds, such as instructions broadcast over a PA system. In another non-limiting example, passengers may be directed to unload by displaying instructions on a display, such as a display embedded into the seat in front of a passenger. In another non-limiting example, passengers may be directed to unload by flight attendants.

Still referring to FIG. 10, in some embodiments, passengers may load by section. For example loading passengers may be divided into categories pre-loading, according to their section, and loading passengers may be admitted in groups, according to which passenger sections are available for loading.

Still referring to FIG. 10, in some embodiments, passenger loading and unloading times may be improved by omitting above-seat luggage storage. In some embodiments, BWB aircraft 100 may include above-seat luggage storage (such as for easy access to luggage by passengers). In some embodiments, BWB aircraft 100 may omit above-seat luggage storage (such as to reduce the amount of time it takes for passengers to load and unload due to passengers blocking aisles as they store or remove their luggage). In some embodiments, passenger luggage may be stored elsewhere, such as beneath a seat, or in a separate bay for storing luggage.

Still referring to FIG. 10, in some embodiments, BWB aircraft 100 may depart when: old passengers have unloaded, new passengers have loaded, galleys have been serviced, BWB aircraft 100 has been cleaned, pilots and cabin attendants have been exchanged, jetways have been withdrawn, doors are closed and armed, and external servicing is complete.

Figure 11:
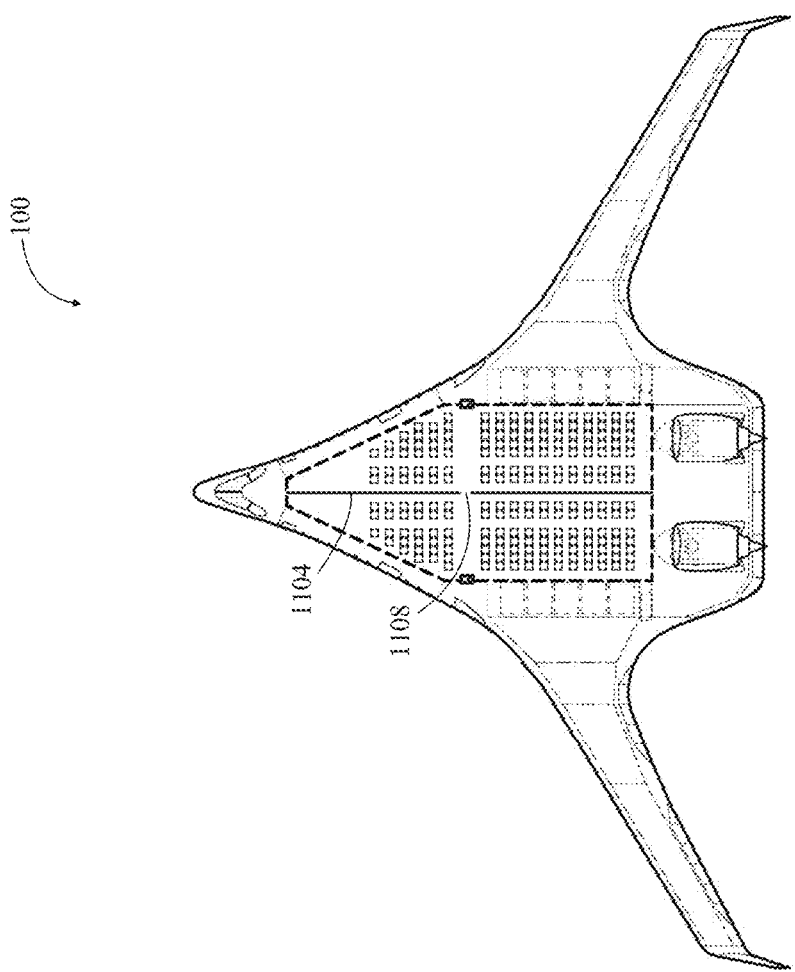
FIG. 11 is a schematic illustration of a top view of an exemplary blended wing body aircraft, showing an exemplary layout of a passenger cabin and passenger doors.

Now referring to FIG. 11, in some embodiments, BWB aircraft 100 may include a longitudinal structural element 1104. In some embodiments, longitudinal structural element 1104 may include, in a non-limiting example, a wall. In some embodiments, longitudinal structural element 1104 may divide passenger cabin into multiple cabin bays. In some embodiments, BWB aircraft 100 may include an opening in longitudinal structural element 1104 such as door 1108.

Figure 12:
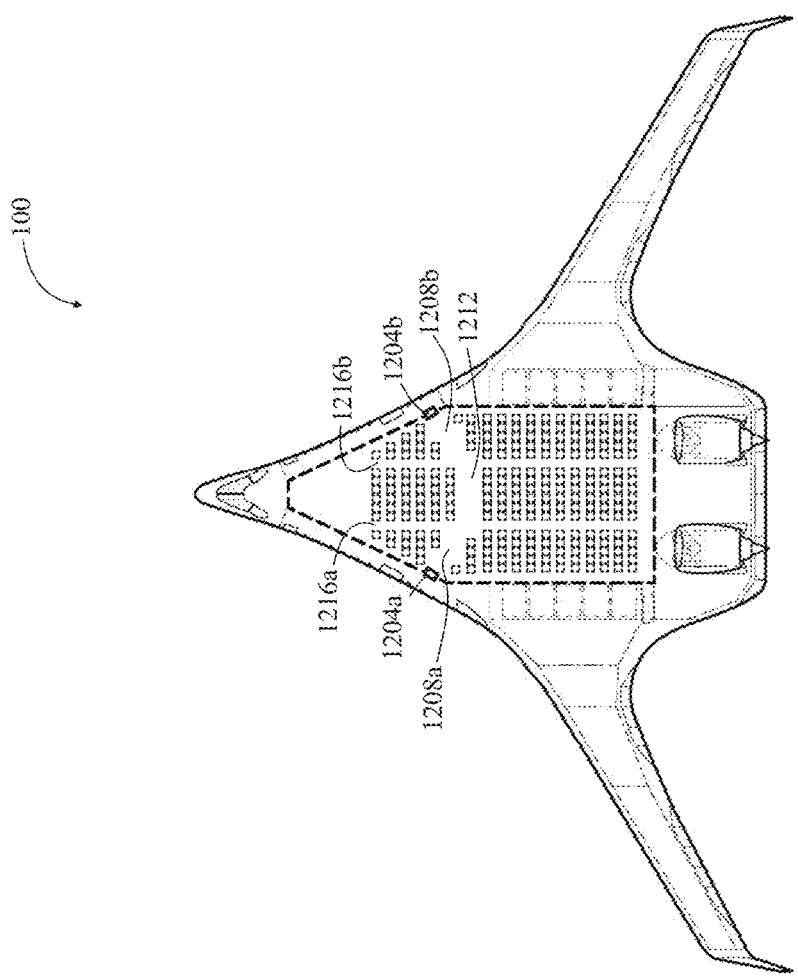
FIG. 12 is a schematic illustration of a top view of an exemplary blended wing body aircraft, showing an exemplary layout of a passenger cabin and passenger doors.

Now referring to FIG. 12, in some embodiments, BWB aircraft 100 may include a slanted aisle, such as slanted aisles 1208*a* and 1208*b*. In some embodiments, a slanted aisle may run orthogonal to a leading edge of BWB aircraft 100, from a passenger door (such as passenger door 1204*a* or 1204*b*) to another aisle such as a lateral aisle (such as lateral aisle 1212) or longitudinal aisle (such as longitudinal aisle 1216*a* or 1216*b*). In some embodiments, a slanted aisle may be mirrored on the other lateral side of BWB aircraft 100. In some embodiments, a slanted aisle may lead to a passenger door on a leading edge of BWB aircraft 100.

Figure 13:
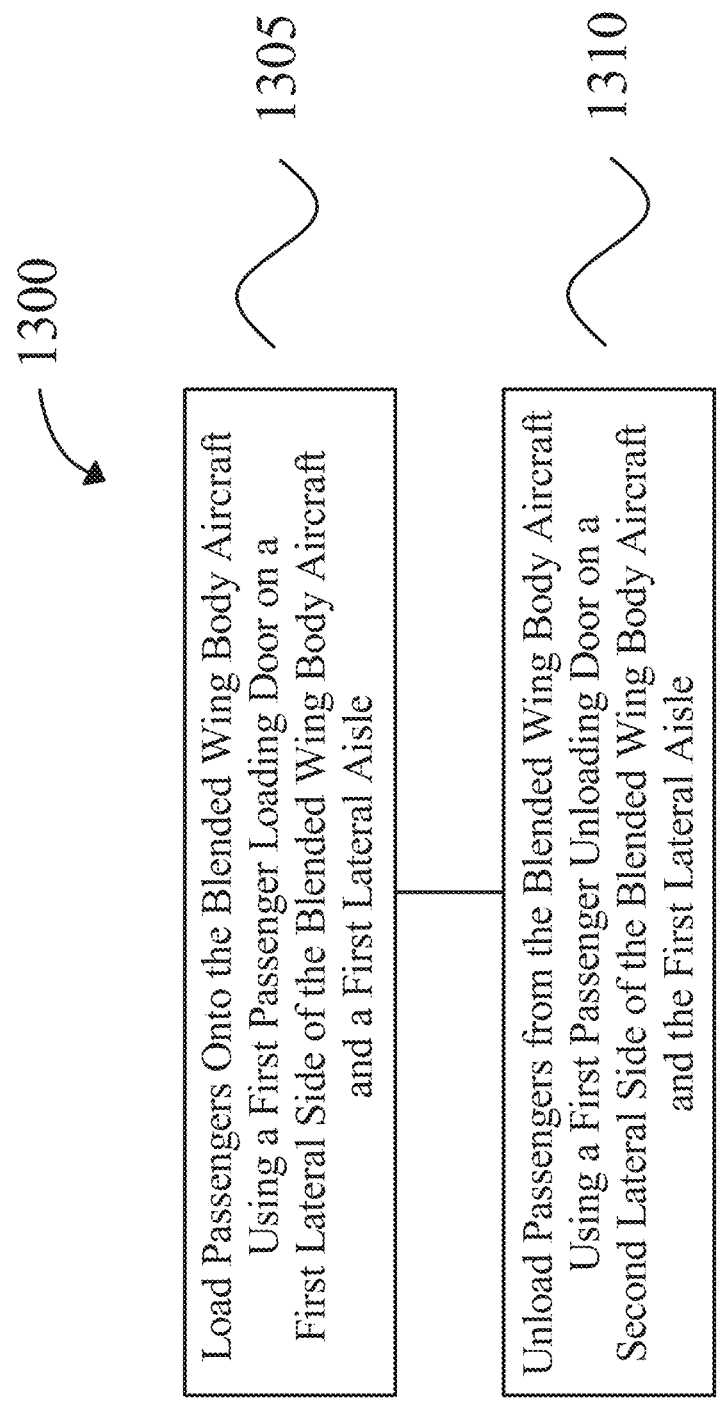
FIG. 13 is a flow diagram depicting an exemplary method of loading and unloading a blended wing body aircraft.

Now referring to FIG. 13, an exemplary embodiment of a method 1300 of loading and unloading a blended wing body aircraft is illustrated. In some embodiments, method 1300 includes loading passengers onto the blended wing body aircraft using a first passenger loading door on a first lateral side of the blended wing body aircraft and a first lateral aisle 1305. In some embodiments, method 1300 includes unloading passengers from the blended wing body aircraft using a first passenger unloading door on a second lateral side of the blended wing body aircraft and the first lateral aisle 1310. In some embodiments, the first lateral aisle runs in a straight line from the first passenger loading door to the first passenger unloading door. In some embodiments, a longitudinal structural element separates a passenger cabin into a first bay and a second bay, wherein the first lateral aisle passes through the longitudinal structural element. In some embodiments, the first passenger loading door and the first passenger unloading door are behind wings of the blended wing body aircraft. In some embodiments, the first passenger loading door and the first passenger unloading door are on the leading edge of the blended wing body aircraft. In some embodiments, the first passenger loading door and the first passenger unloading door are substantially orthogonal to a lateral axis of the blended wing body aircraft. In some embodiments, the first passenger loading door and the first passenger unloading door are behind all passenger seats in the blended wing body aircraft. In some embodiments, method 1300 further includes loading passengers onto the blended wing body aircraft using a second passenger loading door on the first lateral side of the blended wing body aircraft and a second lateral aisle; and unloading passengers from the blended wing body aircraft using a second passenger unloading door on the second lateral side of the blended wing body aircraft and the second lateral aisle. In some embodiments, the first passenger loading door and the first passenger unloading door are connected to a first passenger bay and the second passenger loading door and the second passenger unloading door are connected to a second passenger bay. In some embodiments, method 1300 further includes loading passengers onto the blended wing body aircraft using a third passenger loading door and a fourth passenger loading door on the first lateral side of the blended wing body aircraft; and unloading passengers from the blended wing body aircraft using a third passenger unloading door and a fourth passenger unloading door on the second lateral side of the blended wing body aircraft.

Still referring to FIG. 13, in some embodiments, passengers unload in sections; wherein a cleaning crew cleans sections left unoccupied by unloading passengers before all passengers have finished unloading. In some embodiments, the cleaning crew loads onto the blended wing body aircraft using the first passenger door on the first lateral side of the blended wing body aircraft and the first lateral aisle, and unloads from the blended wing body aircraft using the first passenger door on the second lateral side of the blended wing body aircraft and the first lateral aisle. In some embodiments, passengers load into sections cleaned by the cleaning crew before all passengers have finished unloading. In some embodiments, passengers unload in sections; wherein passengers load into sections left unoccupied by unloading passengers before all passengers have finished unloading.

Still referring to FIG. 13, in some embodiments, passengers may load onto and/or unload from a BWB aircraft using a plurality of longitudinal aisles. As non-limiting examples, a BWB aircraft may have 2, 3, or 4 longitudinal aisles, and passengers may use these for loading and/or unloading the aircraft. In some embodiments, passengers may be loaded using a plurality of jetways. In non-limiting examples, 1, 2, 3, 4, 5, 6, or more jetways may be used. In some embodiments, 2 jetways are used to load passengers. In some embodiments, 1 jetway is used to unload passengers. In some embodiments, each jetway connects to a separate door, such as a door on the leading edge of BWB aircraft 100.

In some embodiments an aircraft and/or an element of an aircraft may be consistent with an aircraft and/or an element of an aircraft disclosed in U.S. patent application Ser. No. 18/201,944, filed on May 2023, and titled "BLENDED WING BODY AIRCRAFT.".

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 14:
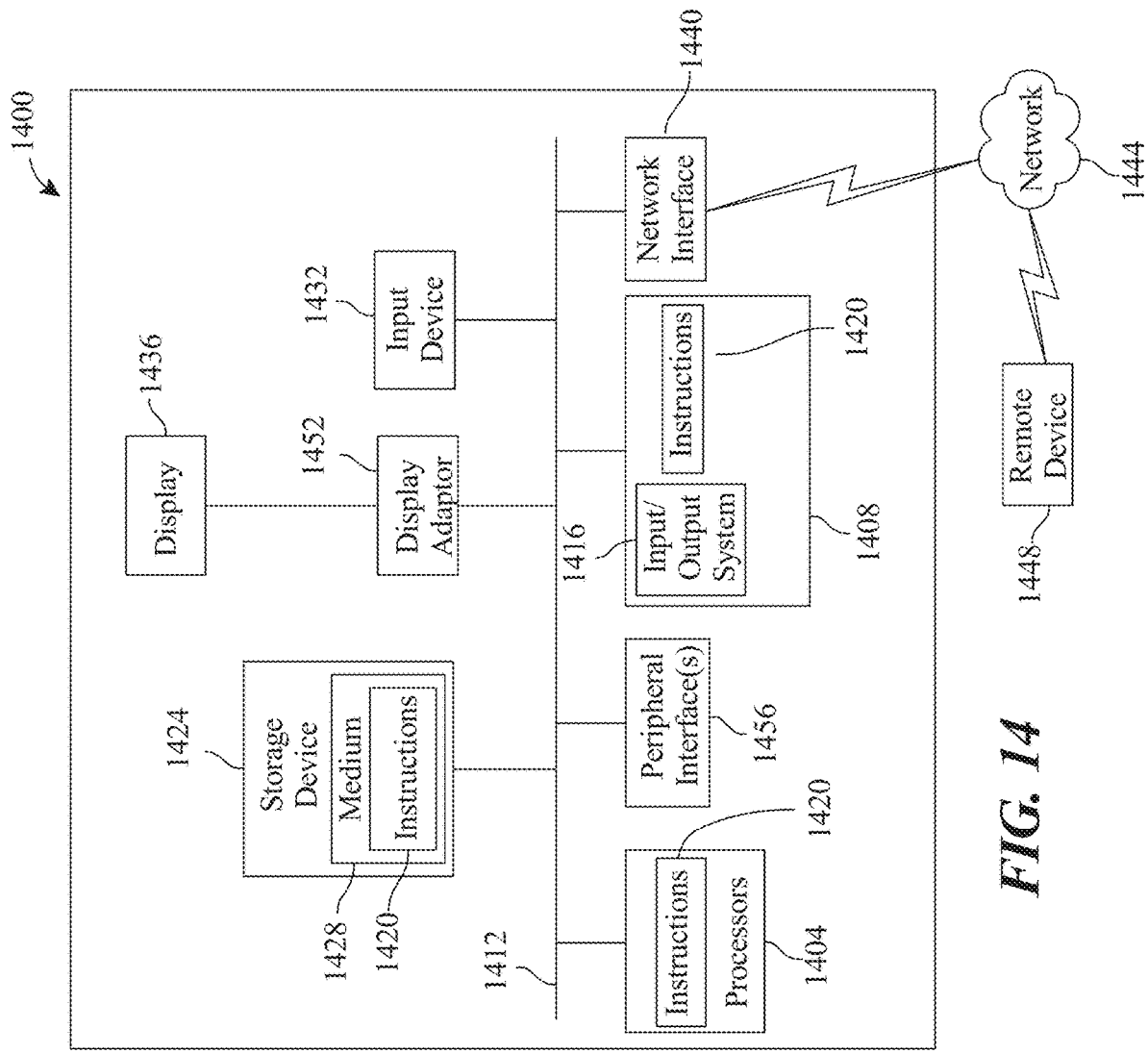
FIG. 14 is a block diagram of a computing system that can be used to implement any one or more of the methodologies disclosed herein and any one or more portions thereof.

FIG. 14 shows a diagrammatic representation of one embodiment of a computing device in the exemplary form of a computer system 1400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1400 includes a processor 1404 and a memory 1408 that communicate with each other, and with other components, via a bus 1412. Bus 1412 may include any of several types of bus structures including, but not limited to, a memory bus, a memory controller, a peripheral bus, a local bus, and any combinations thereof, using any of a variety of bus architectures.

Processor 1404 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1404 may be organized according to Von Neumann and/or Harvard architecture as a non-limiting example. Processor 1404 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1408 may include various components (e.g., machine-readable media) including, but not limited to, a random-access memory component, a read only component, and any combinations thereof. In one example, a basic input/output system 1416 (BIOS), including basic routines that help to transfer information between elements within computer system 1400, such as during start-up, may be stored in memory 1408. Memory 1408 may also include (e.g., stored on one or more machine-readable media) instructions (e.g., software) 1420 embodying any one or more of the aspects and/or methodologies of the present disclosure. In another example, memory 1408 may further include any number of program modules including, but not limited to, an operating system, one or more application programs, other program modules, program data, and any combinations thereof.

Computer system 1400 may also include a storage device 1424. Examples of a storage device (e.g., storage device 1424) include, but are not limited to, a hard disk drive, a magnetic disk drive, an optical disc drive in combination with an optical medium, a solid-state memory device, and any combinations thereof. Storage device 1424 may be connected to bus 1412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1424 (or one or more components thereof) may be removably interfaced with computer system 1400 (e.g., via an external port connector (not shown)). Particularly, storage device 1424 and an associated machine-readable medium 1428 may provide nonvolatile and/or volatile storage of machine-readable instructions, data structures, program modules, and/or other data for computer system 1400. In one example, software 1420 may reside, completely or partially, within machine-readable medium 1428. In another example, software 1420 may reside, completely or partially, within processor 1404.

Computer system 1400 may also include an input device 1432. In one example, a user of computer system 1400 may enter commands and/or other information into computer system 1400 via input device 1432. Examples of an input device 1432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1432 may be interfaced to bus 1412 via any of a variety of interfaces (not shown) including, but not limited to, a serial interface, a parallel interface, a game port, a USB interface, a FIREWIRE interface, a direct interface to bus 1412, and any combinations thereof. Input device 1432 may include a touch screen interface that may be a part of or separate from display 1436, discussed further below. Input device 1432 may be utilized as a user selection device for selecting one or more graphical representations in a graphical interface as described above.

A user may also input commands and/or other information to computer system 1400 via storage device 1424 (e.g., a removable disk drive, a flash drive, etc.) and/or network interface device 1440. A network interface device, such as network interface device 1440, may be utilized for connecting computer system 1400 to one or more of a variety of networks, such as network 1444, and one or more remote devices 1448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1444, may employ a wired and/or a wireless mode of communication. In general, any network topology may be used. Information (e.g., data, software 1420, etc.) may be communicated to and/or from computer system 1400 via network interface device 1440.

Computer system 1400 may further include a video display adapter 1452 for communicating a displayable image to a display device, such as display device 1436. Examples of a display device include, but are not limited to, a liquid crystal display (LCD), a cathode ray tube (CRT), a plasma display, a light emitting diode (LED) display, and any combinations thereof. Display adapter 1452 and display device 1436 may be utilized in combination with processor 1404 to provide graphical representations of aspects of the present disclosure. In addition to a display device, computer system 1400 may include one or more other peripheral output devices including, but not limited to, an audio speaker, a printer, and any combinations thereof. Such peripheral output devices may be connected to bus 1412 via a peripheral interface 1456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A blended wing body aircraft, comprising:
a plurality of wings; and
a main body, wherein the main body comprises:
   a first passenger loading door on a first lateral side of the blended wing body aircraft;
   a first passenger unloading door on a second lateral side of the blended wing body aircraft;
   a first lateral aisle between the first passenger loading door and the first passenger unloading door; and
   a longitudinal structural element comprising a wall, a window and a door that separates a passenger cabin into a first bay and a second bay, wherein the first lateral aisle passes through the longitudinal structural element;
wherein there is no clear demarcation between the wings and body of the blended wing body aircraft along a leading edge of the blended wing body aircraft.

2. The blended wing body aircraft of claim 1, wherein the first lateral aisle runs in a straight line from the first passenger loading door to the first passenger unloading door.

3. The blended wing body aircraft of claim 1, wherein the first passenger loading door and the first passenger unloading door are behind wings of the blended wing body aircraft.

4. The blended wing body aircraft of claim 1, wherein the first passenger loading door and the first passenger unloading door are on the leading edge of the blended wing body aircraft.

5. The blended wing body aircraft of claim 1, wherein the first passenger loading door and the first passenger unloading door are substantially orthogonal to a lateral axis of the blended wing body aircraft.

6. The blended wing body aircraft of claim 1, wherein the first passenger loading door and the first passenger unloading door are behind all passenger seats in the blended wing body aircraft.

7. The blended wing body aircraft of claim 1, further comprising:
a second passenger loading door on the first lateral side of the blended wing body aircraft;
a second passenger unloading door on the second lateral side of the blended wing body aircraft; and
a second lateral aisle between the second passenger loading door and the second passenger unloading door.

8. The blended wing body aircraft of claim 7:
wherein the blended wing body aircraft further comprises a first passenger bay and a second passenger bay;
wherein the first passenger loading door and the first passenger unloading door are connected to the first passenger bay and the second passenger loading door and the second passenger unloading door are connected to the second passenger bay.

9. The blended wing body aircraft of claim 7, further comprising:
a third passenger loading door on the first lateral side of the blended wing body aircraft; and
a third passenger unloading door on the second lateral side of the blended wing body aircraft.

10. A method of loading and unloading a blended wing body aircraft, the method comprising:
loading passengers onto the blended wing body aircraft using a first passenger loading door on a first lateral side of the blended wing body aircraft and a first lateral aisle, wherein the first lateral aisle passes through a longitudinal structural element which comprises a wall, a window and a door that separates a passenger cabin into a first bay and a second bay; and unloading passengers from the blended wing body aircraft using a first passenger unloading door on a second lateral side of the blended wing body aircraft and the first lateral aisle.

11. The method of claim 10, wherein passengers unload in sections; wherein a cleaning crew cleans sections left unoccupied by unloading passengers before all passengers have finished unloading.

12. The method of claim 11, wherein the cleaning crew loads onto the blended wing body aircraft using the first passenger door on the first lateral side of the blended wing body aircraft and the first lateral aisle, and unloads from the blended wing body aircraft using the first passenger door on the second lateral side of the blended wing body aircraft and the first lateral aisle.

13. The method of claim 11, wherein passengers load into sections cleaned by the cleaning crew before all passengers have finished unloading.

14. The method of claim 10, wherein passengers unload in sections; wherein passengers load into sections left unoccupied by unloading passengers before all passengers have finished unloading.

15. The method of claim 10, wherein the first lateral aisle runs in a straight line from the first passenger loading door to the first passenger unloading door.

16. The method of claim 10, wherein the first passenger loading door and the first passenger unloading door are behind all passenger seats in the blended wing body aircraft.

17. The method of claim 10, further comprising:
loading passengers onto the blended wing body aircraft using a second passenger loading door on the first lateral side of the blended wing body aircraft and a second lateral aisle; and
unloading passengers from the blended wing body aircraft using a second passenger unloading door on the second lateral side of the blended wing body aircraft and the second lateral aisle.

18. The method of claim 17, wherein the first passenger loading door and the first passenger unloading door are connected to the first passenger bay and the second passenger loading door and the second passenger unloading door are connected to the second passenger bay.

19. The method of claim 17, further comprising:
loading passengers onto the blended wing body aircraft using a third passenger loading door on the first lateral side of the blended wing body aircraft; and
unloading passengers from the blended wing body aircraft using a third passenger unloading door on the second lateral side of the blended wing body aircraft.

* * * * *